United States Patent
Evans

(10) Patent No.: US 10,207,805 B2
(45) Date of Patent: Feb. 19, 2019

(54) DRONE TRANSPORT SYSTEM

(71) Applicant: Michael Steward Evans, San Jose, CA (US)

(72) Inventor: Michael Steward Evans, San Jose, CA (US)

( * ) Notice: Subject to any disclaimer, the term of this patent is extended or adjusted under 35 U.S.C. 154(b) by 62 days.

(21) Appl. No.: 15/456,311

(22) Filed: Mar. 10, 2017

(65) Prior Publication Data
US 2018/0194469 A1    Jul. 12, 2018

Related U.S. Application Data

(60) Provisional application No. 62/443,187, filed on Jan. 6, 2017.

(51) Int. Cl.
| | |
|---|---|
| *B64D 9/00* | (2006.01) |
| *B64C 39/02* | (2006.01) |
| *B64D 11/06* | (2006.01) |
| *G06Q 10/02* | (2012.01) |

(52) U.S. Cl.
CPC .............. *B64D 9/00* (2013.01); *B64C 39/024* (2013.01); *B64D 11/06* (2013.01); *G06Q 10/02* (2013.01); *B64C 2201/027* (2013.01); *B64C 2201/042* (2013.01); *B64C 2201/108* (2013.01); *B64C 2201/128* (2013.01); *B64C 2201/146* (2013.01)

(58) Field of Classification Search
CPC ............ B64C 39/024; B64C 2201/027; B64C 2201/042; B64C 2201/108; B64C 2201/128
See application file for complete search history.

(56) References Cited

U.S. PATENT DOCUMENTS

| | | | | |
|---|---|---|---|---|
| 9,070,101 | B2 * | 6/2015 | Abhyanker | G01C 1/00 |
| 9,174,733 | B1 * | 11/2015 | Burgess | B64D 1/12 |
| 9,242,728 | B2 | 1/2016 | Morrison | |
| 9,305,280 | B1 * | 4/2016 | Berg | G08G 5/0069 |
| 9,536,216 | B1 | 1/2017 | Lisso | |
| 9,815,633 | B1 * | 11/2017 | Kisser | B64C 39/024 |
| 2009/0008499 | A1 * | 1/2009 | Shaw | B64C 27/20 |
| | | | | 244/17.23 |
| 2009/0299551 | A1 * | 12/2009 | So | B64C 39/024 |
| | | | | 701/3 |
| 2014/0254896 | A1 * | 9/2014 | Zhou | B25J 9/0006 |
| | | | | 382/124 |

(Continued)

*Primary Examiner* — Christopher P Ellis
(74) *Attorney, Agent, or Firm* — Donald R. Boys; Central Coast Patent Agency LLC

(57) ABSTRACT

A drone transport system has a carrier pod adapted for carrying a passenger or parcels with the passenger or parcels enclosed, the carrier pod having a first attachment interface at an uppermost extremity, the attachment interface having one or first physical attachment elements, and a flight-enabled drone having a downward-facing second attachment interface having one or more second physical attachment elements compatible with the first physical attachment elements of the carrier pod. The flight-enabled drone is controllable to approach the carrier pod from above, to align and engage the second physical attachment elements with the first physical attachment elements, to lift and carry the pod from one place to another, and to land and disengage the first and second physical attachment elements, leaving the carrier pod at a new place.

17 Claims, 18 Drawing Sheets

(56) References Cited

U.S. PATENT DOCUMENTS

| | | | |
|---|---|---|---|
| 2015/0120094 A1* | 4/2015 | Kimchi | B64C 39/024 701/3 |
| 2015/0120126 A1* | 4/2015 | So | G01C 23/00 701/26 |
| 2015/0158587 A1* | 6/2015 | Patrick | B64C 39/024 244/137.4 |
| 2015/0332206 A1 | 11/2015 | Trew et al. | |
| 2016/0117931 A1 | 4/2016 | Chan et al. | |
| 2016/0246304 A1* | 8/2016 | Canoy | G05D 1/0816 |
| 2016/0318609 A1* | 11/2016 | Lynn | B64C 39/024 |
| 2016/0340006 A1* | 11/2016 | Tang | B63C 9/01 |
| 2017/0116814 A1* | 4/2017 | Storch | G07F 17/0057 |
| 2017/0197710 A1* | 7/2017 | Ma | G05D 1/0676 |
| 2018/0117981 A1* | 5/2018 | Lacaze | B64C 27/08 |
| 2018/0126871 A1* | 5/2018 | Martinotti | B60L 13/10 |

\* cited by examiner

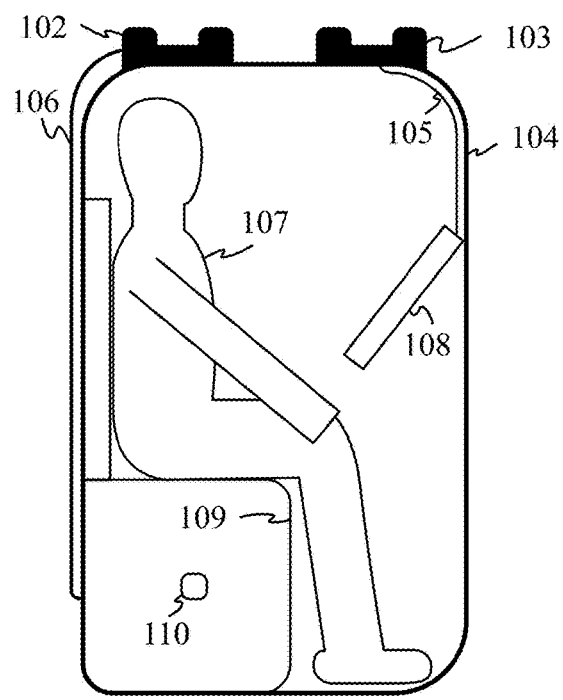
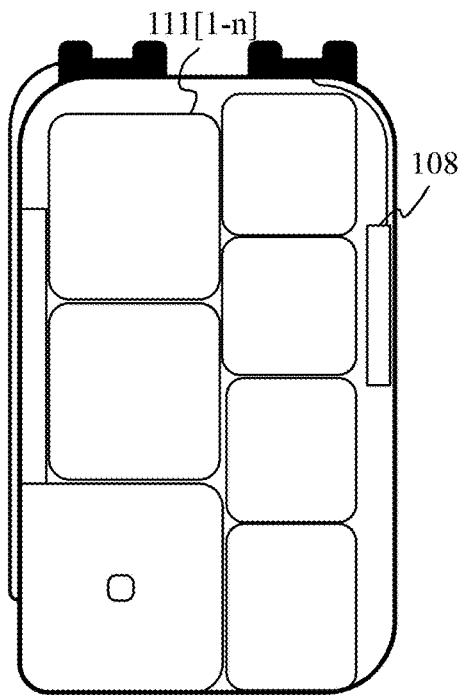
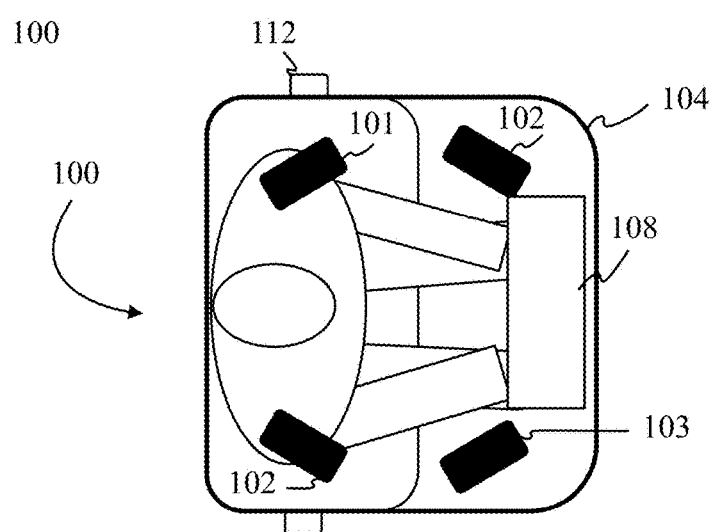
Fig. 1a
Fig. 1b
Fig. 1c

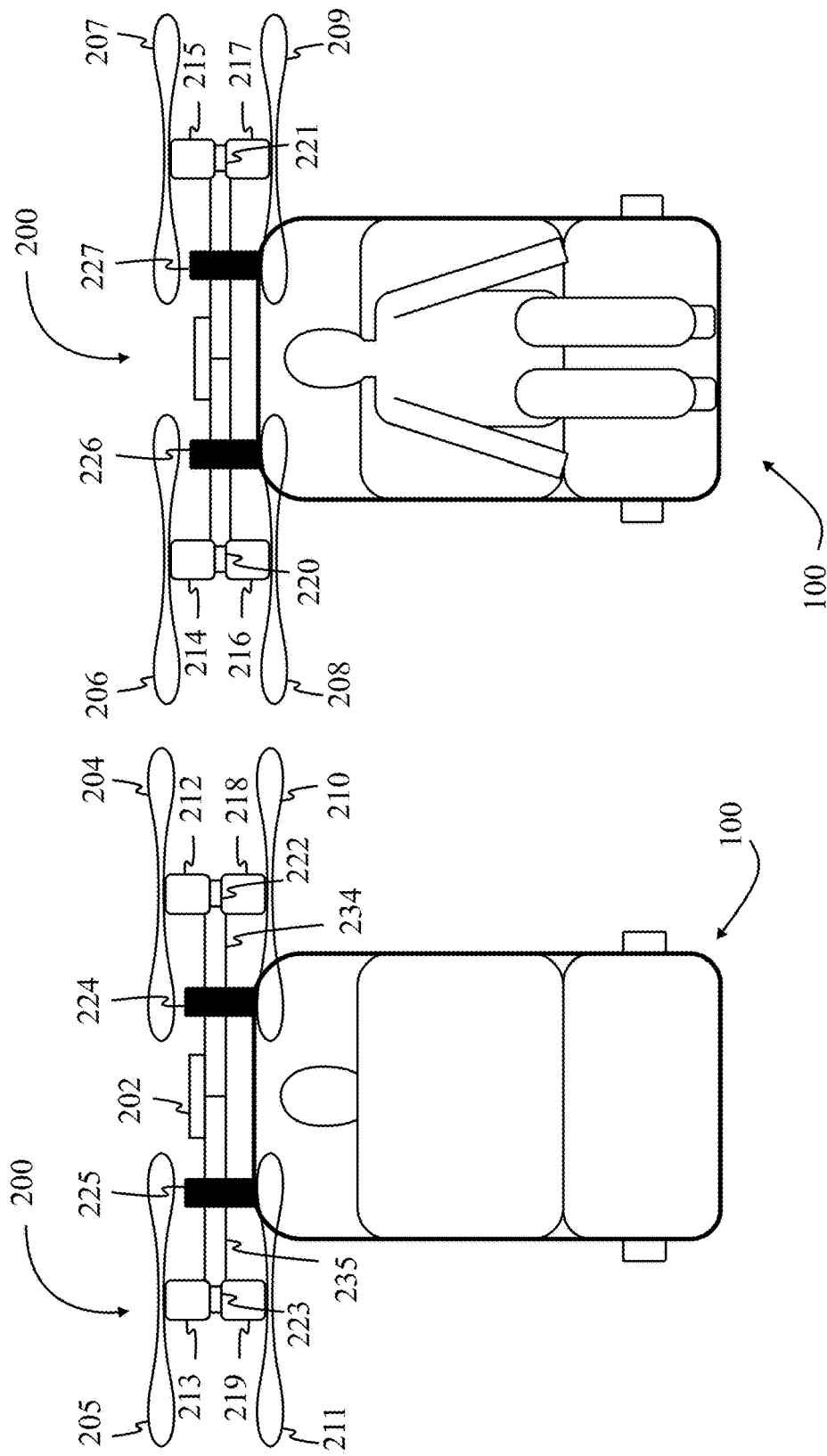

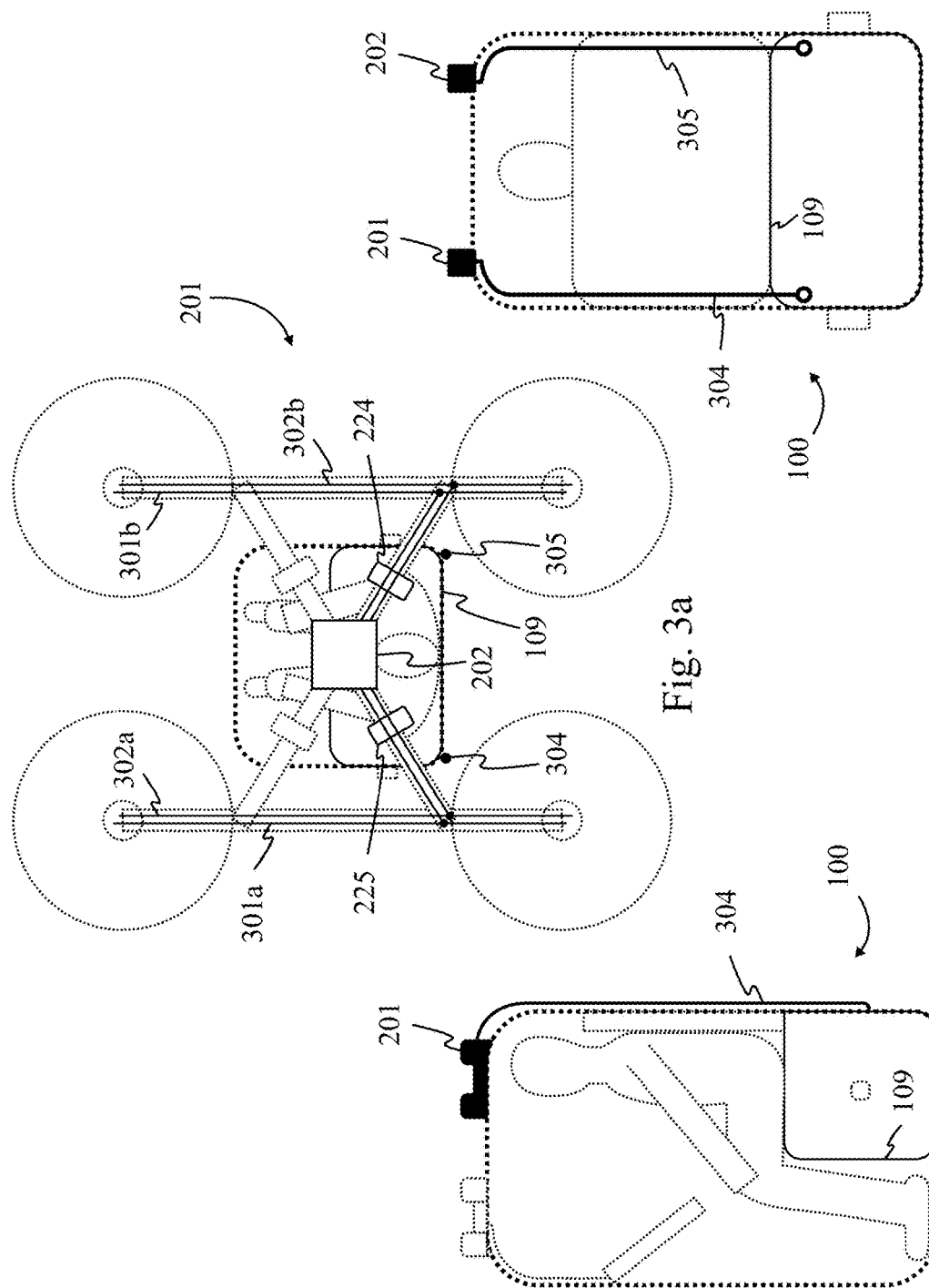

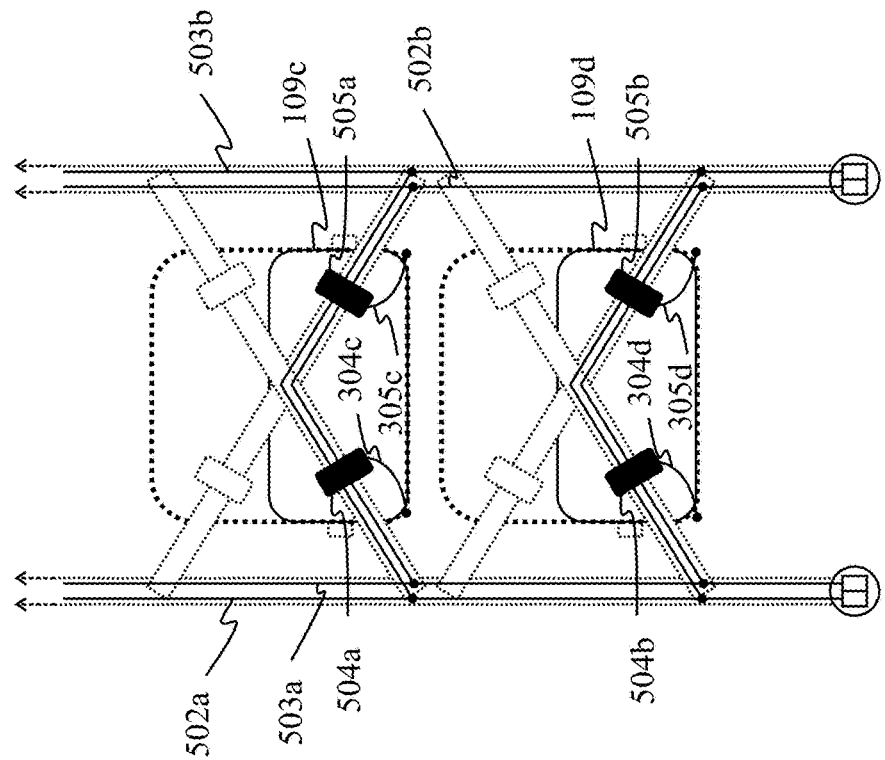
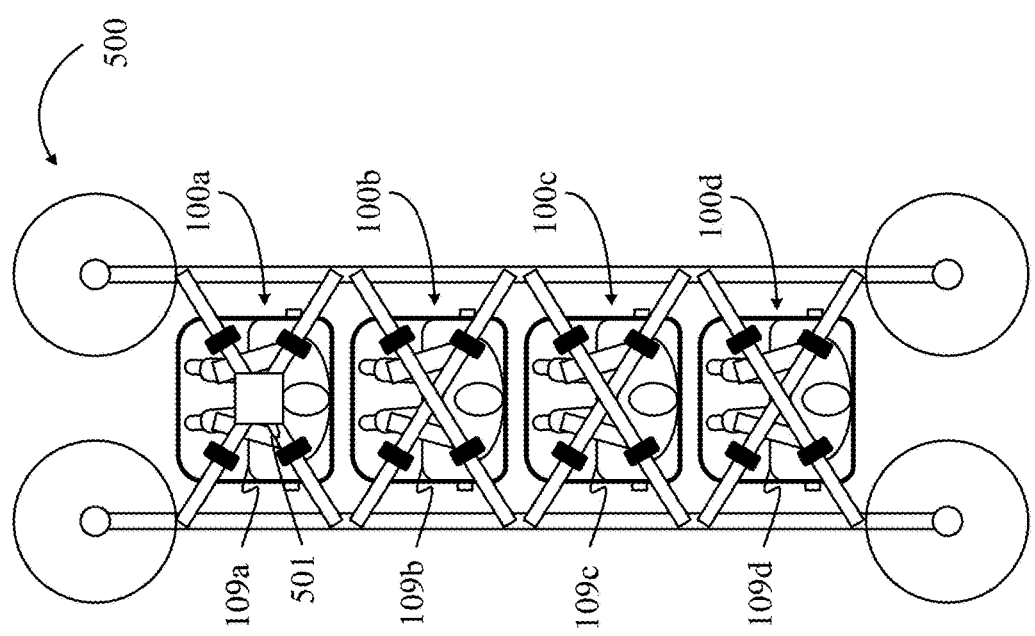
Fig. 5b
Fig. 5a

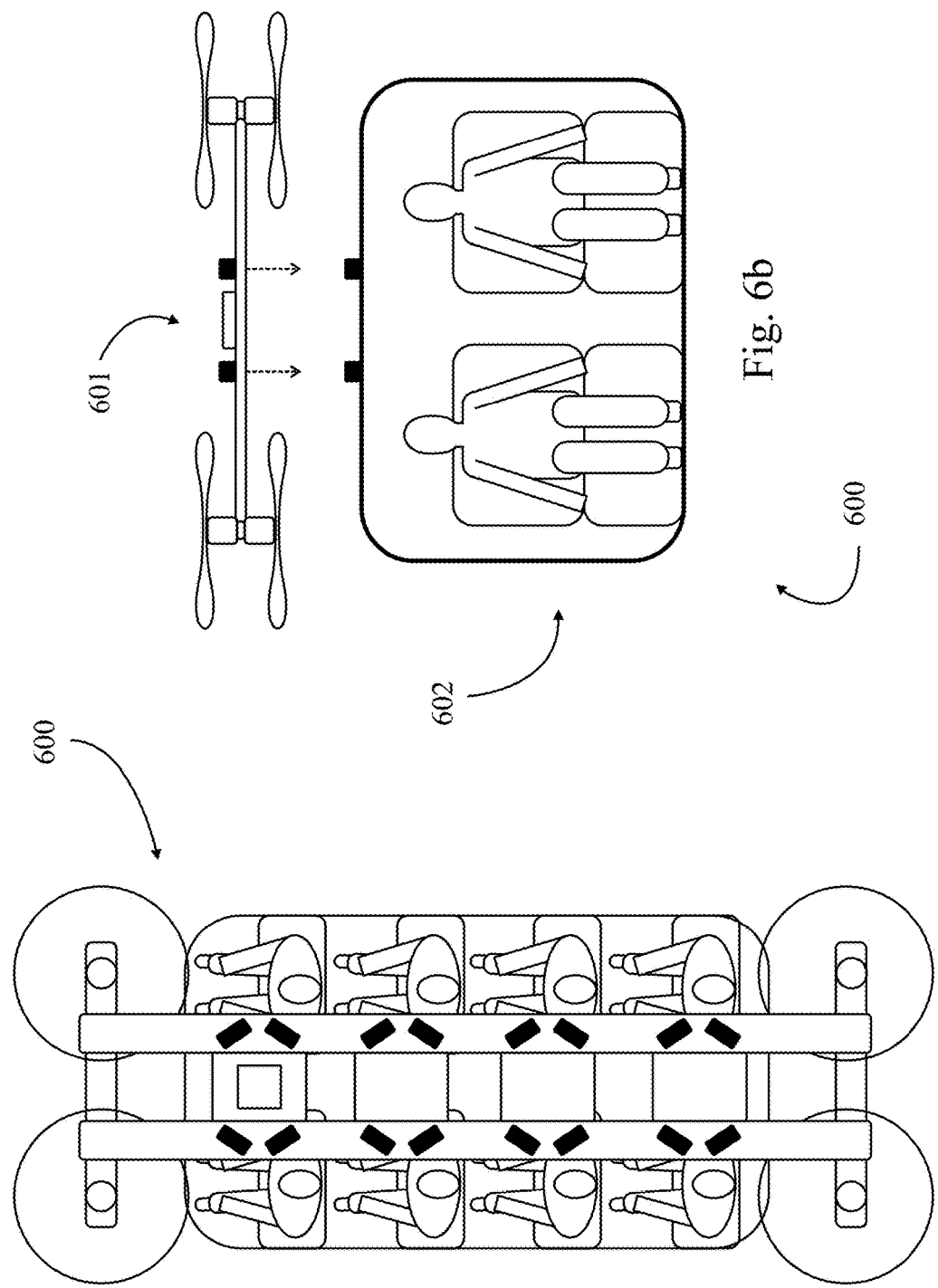

DRONE TRANSPORT SYSTEM

CROSS-REFERENCE TO RELATED APPLICATIONS

The present application claims priority to provisional patent application 62/443,187, filed Jan. 6, 2017, and all disclosure of the priority document is incorporated herein at least by reference.

BACKGROUND OF THE INVENTION

1. Field of the Invention

The present invention is in the field of drone transportation.

2. Description of Related Art

It is the opinion of many that passenger drones in coming years will slowly replace cars and small trucks, and will be able to carry one passenger, or multiple, or goods, such as parcels and other cargo. These drones will be autonomous, although under the control of networks, not humans. Most drones will be battery-driven, because battery technology is becoming cost competitive and improving rapidly, enabling batteries to store more energy while decreasing in size and weight.

Besides battery technology, other new technologies exist today to make passenger drones quite feasible: Examples are Internet of Things (IoT) to enable communication between a wide range of electronic devices; collision avoidance, including using video recognition; highly intelligent electronics that are also lightweight, cheap and small; advanced radio communications, such as the latest WiFi specifications and upcoming 5G variants; advanced fast response motors and control; and new flying technologies and materials that are lightweight and strong. Also, the demand is now here for two major reasons. Firstly, three-dimensional, above-ground transport avoids rush hour traffic jams, where commuters all over the world get stuck every morning and evening wasting valuable time on a 2-dimensional surface. Secondly, for environmental reasons, because batteries plus electric motors eliminate the need for fossil fuels and are now cost competitive.

Presently passenger drones comprise mainly single units with the passenger inside the drone. This type of drone could be adequate for limited journeys, but each drone type may not be compatible with others from different manufacturers. Therefore, what is clearly needed is a drone transport system that allows for flexibility, convenience, and is standardized so that the system may be widely utilized.

BRIEF SUMMARY OF THE INVENTION

In an embodiment of the present invention a drone transport system is provided, comprising a carrier pod adapted for carrying a passenger or parcels with the passenger or parcels enclosed, the carrier pod having a first attachment interface at an uppermost extremity, the attachment interface having one or first physical attachment elements, and a flight-enabled drone having a downward-facing second attachment interface having one or more second physical attachment elements compatible with the first physical attachment elements of the carrier pod. The flight-enabled drone is controllable to approach the carrier pod from above, to align and engage the second physical attachment elements with the first physical attachment elements, to lift and carry the pod from one place to another, and to land and disengage the first and second physical attachment elements, leaving the carrier pod at a new place.

In one embodiment, the first and the second attachment interfaces comprise at least two physical attachment elements each, providing redundancy. Also in one embodiment, there are four attachment elements in each of the first and the second attachment interfaces. In one embodiment, the carrier pod is a passenger pod accommodating one person and includes a seat for the one person. And in one embodiment, the carrier pod is a parcel carrier pod, has the same attachment interface as a passenger pod, but has no seat for a passenger.

In one embodiment of the system the flight-enabled drone is enabled to attach to and carry a plurality of passenger pods, or parcel pods, or a mixture of each. Also in one embodiment, the flight-enabled drone carries the plurality of passenger or parcel pods arranged in a line in the direction of flight. In one embodiment, the flight enabled drone is adapted to attach to and carry four passenger or parcel pods. In one embodiment, the carrier pod is a passenger pod accommodating a plurality of persons, and includes seats for each of the persons carried. And in one embodiment, the passenger pod accommodates four persons in seats one behind the other.

In one embodiment of the system the passenger pod accommodates eight people in two rows of four each. Also in one embodiment, the flight-enabled drone comprises a plurality of electric motors driving a plurality of propeller rotors. Also in one embodiment, the flight-enabled drone further comprises a control system with wireless connectivity to one or more remote control stations, enabling the flight-enabled drone to be piloted remotely to transport carrier pods from place to place. In one embodiment, the system further comprises a rechargeable battery separate from carrier pods, powering the electric motors driving the plurality of propeller rotors.

In one embodiment of the system, one or more rechargeable batteries are included in one or more carrier pods, with the carrier pods having power lines from the batteries to electrical connectors at the first attachment interfaces, configured to engage mating electrical connectors at the second attachment interfaces when carrier pods are engaged to the flight-enable drone, such that batteries in the carrier pods power the drone. Also in one embodiment, the batteries are located beneath passenger seats. Also in one embodiment, individual carrier pods comprise a control panel having I/O capability for a passenger to input and access data and information. In one embodiment, the system further comprises surface-located exchange stations at different locals, enabling exchange of carrier pods by flight-enable drones, such that carrier pods may be efficiently routed from and to a wide variety of surface locations. In one embodiment, exchange stations comprise facilities for passengers to embark and disembark to carrier pods, and for flight-enabled drones to engage and lift, and land and disengage carrier pods. And in one embodiment the system further comprises computerized control for scheduling flights, ticketing and booking.

BRIEF DESCRIPTION OF THE SEVERAL VIEWS OF THE DRAWINGS

FIG. 1a is a side view of a single-person pod occupied by a person according to one embodiment of the present invention.

FIG. 1b is a side view of a pod occupied by a plurality of parcels to be delivered according to one embodiment of the present invention.

FIG. 1c is a top view of a single-person pod occupied by a person according to one embodiment of the present invention.

FIG. 2c is a rear view of a single-person pod attached to a transport drone according to one embodiment of the present invention.

FIG. 2d is a front view of a single-person pod attached a to transport drone according to one embodiment of the present invention.

FIG. 3a is a top view of a transport drone with an attached pod with a wiring layout according to one embodiment of the present invention.

FIG. 3b is a side view of a pod with a wiring layout according to one embodiment of the present invention.

FIG. 3c is a back view of a pod with a wiring layout according to one embodiment of the present invention.

FIG. 5a is a top view of a 4-pod transport drone capable of transporting four single-person pods according to one embodiment of the present invention.

FIG. 5b is an in-depth top view of a segment of a 4-pod transport drone according to one embodiment of the present invention.

FIG. 6a is a top view of a transport drone capable of transporting an eight-person pod according to one embodiment of the present invention.

FIG. 6b is a front view of a transport drone capable of transporting an eight-person pod according to one embodiment of the present invention.

DETAILED DESCRIPTION OF THE INVENTION

Single Pod Drones

Figure 2A:
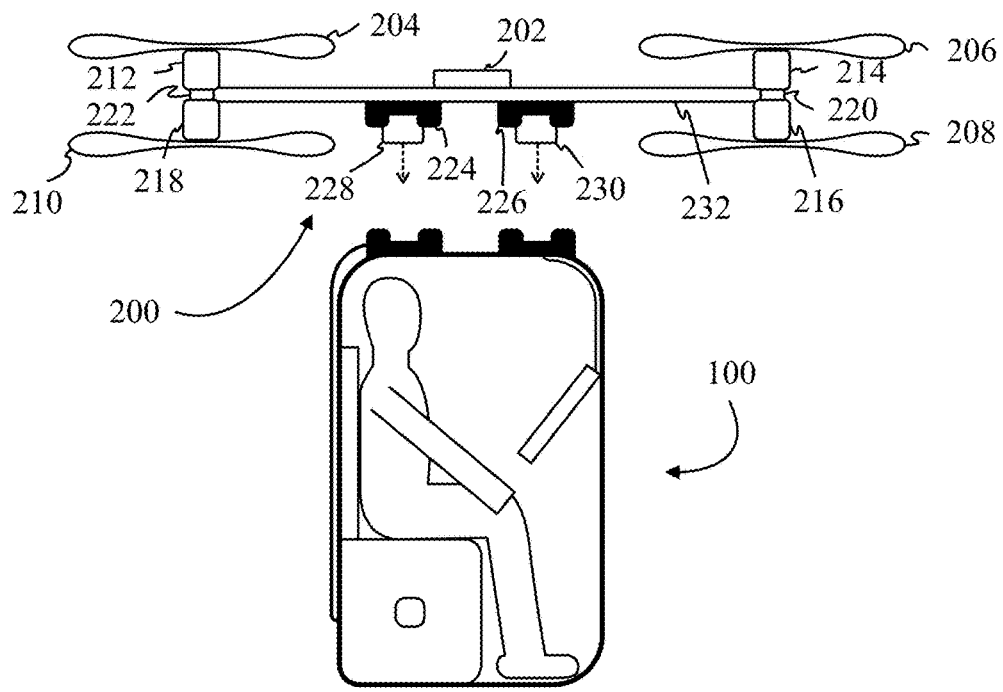
FIG. 2a is a side view of a single-person pod soon to be attached to a transport drone according to one embodiment of the present invention.
Figure 2B:
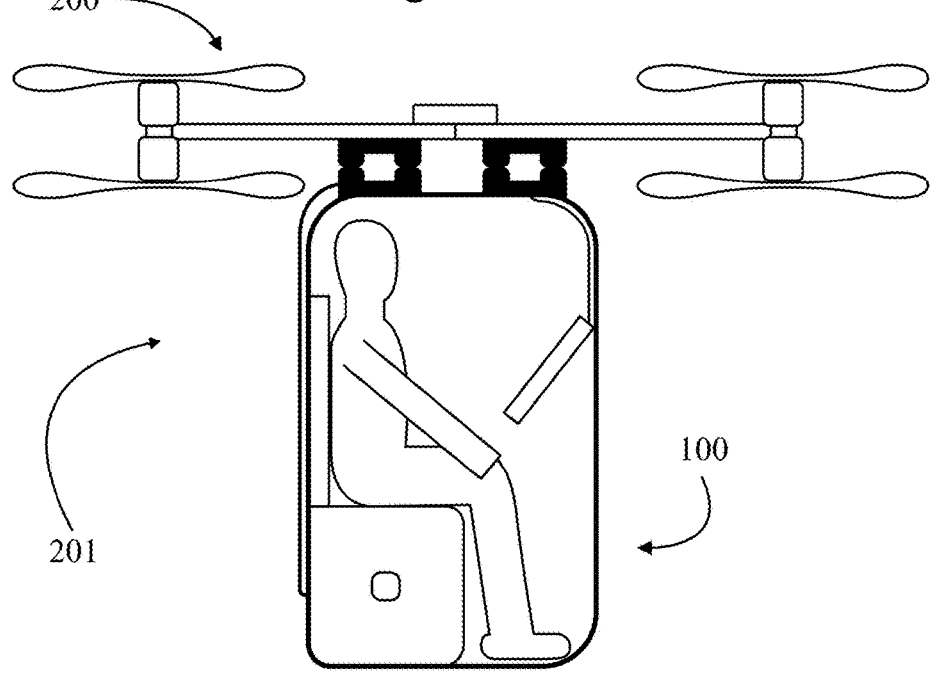
FIG. 2b is a side view of a single-person pod attached to a transport drone according to one embodiment of the present invention.
Figure 2E:
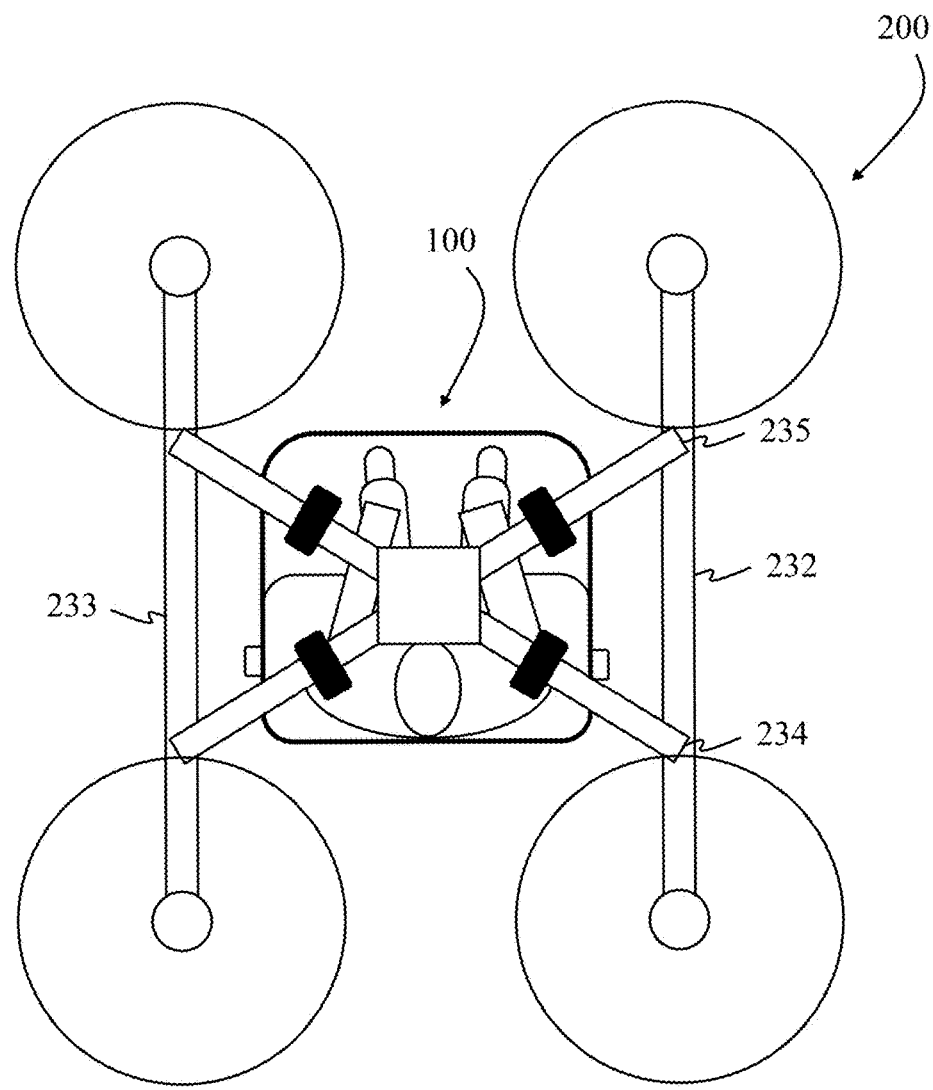
FIG. 2e is a top view of a single-person pod attached to a transport drone according to one embodiment of the present invention.

What is generally proposed as unique in embodiment of the invention is a drone and pods which may separate from each other. All pods in this system may conform to a standardized drone-pod attaching system, and the pods may be used to carry either passengers, parcels, or both.

FIGS. 1a to 1c are illustrations of a pod 100 according to one embodiment of the present invention. Pod 100 comprises a capsule 113 about the height of a passenger 107 while seated and around 1 m×1 m (3'×3') in width and depth. These dimensions are exemplary, and may vary considerably. Pod 100 may have four latches on its roof, a first pod latch 101, a second pod latch 102, a third pod latch 103, and a fourth pod latch 104, in order to latch the pod to a transport drone, as explained in further detail below. In the embodiment illustrated, a single occupant 107 is inside pod 100, but pod 100 may be adapted for other arrangements, such as, but not limited to, a mother with baby, or two small children, or an adult with an animal, such as a dog, or an adult with baggage that will fit in an overhead luggage compartment that may be present. Pod 100 may have a maximum weight limit for the total load, above which the drone may not take off as a safety precaution. A pod control box 108 present in pod 100 may display the present weight of the contents of pod 100, along with other relevant information. Pod control box 108 is further detailed below. Besides being used to transport passengers, pod 100 may be used to transport parcels 111[1-n], as shown in FIG. 1b. Parcels 111[1-n] may be loaded in at an approved parcel bay by a qualified loader.

Each pod 100 may have a highly intelligent pod control box 108 that has its own touch screen display in front of occupant 107. The control may box may be foldable to be flat against the front side in the case of transporting parcels 111[1-n], but relevant information may remain visible from the outside in case of issues. Pod control box 108 links up to the roof of pod 100 by wired or wireless connection for connecting to a drone. In one embodiment of the present invention, control box 108 may be an internet-connected interactive screen with a highspeed internet link to a drone management system for both communications and entertainment of passengers. The control box 108 is powered from the pod's battery, via two cables, one on each side of the pod, for dual redundancy.

In one embodiment, as passenger 107 enters through a side door, the side door closes and auto-locks after passenger 107 is seated. Under the seat is a battery with charger controller 109, both located where they are not in the way. Battery and charger controller 109 may also be significantly heavy enough, such that the center of mass is shifted towards the bottom of a drone-pod unit, therefore providing increased stability. The battery is charged through the charger controller via either a first charging receptacle 110 or a second charging receptacle 112, allowing pod 100 to be charged from either side, or potentially from both sides simultaneously. Charging receptacles 110 and 112 may use any charging standard used in the art. The battery is connected to an attached drone in this example with two redundant identical cables going to the roof of pod 100, as is further detailed below.

FIGS. 2a through 2e show various views of drone 200 attaching to pod 100 to form a pod-drone unit 201 according to one embodiment of the present invention. Drone 200 flies above pod 100 and is connected to the roof of pod 100. Drone 200 may have four of its own compatible latches to compliment pod latches 101 to 104, a first drone latch 224, a second drone latch 225, a third drone latch 226, and a fourth drone latch 227. The latches used in this embodiment are a male and female set, with the male latches attached to drone 200, as indicated with male protrusions 228 and 230. Any latching system commonly used in the art may be used as substitution. Latches 224 to 227 are attached to two diagonal cross struts on drone 200, a first cross strut 234, and a second cross strut 235. It should be understood that the idea of cross struts 234 and 235 is to give drone 200 in this embodiment added stability in all directions, but other designs may be used in its place. The four pairs of latches 101 to 104 and 224 to 227 are for redundancy in case one or even two latches may break or decouple. Latches 101 to 104 and 224 to 227 may be designed to withstand carrying a fully loaded pod with any two latch sets functioning.

Motors 212 to 219 are shown at corners of drone 200, attached to eight motor-drivers in pairs 220 to 223, with two motor-rotor combos per corner, totaling eight totally independent rotors. Each of motors 212 to 219 are attached to its own rotor (propeller) 204 to 211, totaling eight propellers to provide lifting power to drone 200. Drone 200 also has its own control box 202, shown mounted at the junction of the cross-struts 234 and 235. Drone control box 202 works in unison with the pod control box 108 for dual redundancy.

Cross struts 234 and 235 are connected to two front-to-back struts, a right front-to-back strut 232, and a left front-to-back strut 233, with the motors and rotors at each end. Drone 200 may have its own battery, which may comprise small batteries fixed to struts 232 to 235, where they may be positioned in a manner which enables easy access for replacement or maintenance. The total energy available from the drone batteries may be enough to allow an empty drone with no pod to fly for approximately thirty minutes to one hour. This flying duration may improve as battery technology improves. While carrying a pod, pod-drone unit 201 utilizes the larger pod battery 109 and the drone battery does not discharge, allowing for continuing in emergency flight in the case of loss of power of the pod battery. The pod battery is much larger in weight and kWh, and all of the stored energy of a loaded drone may be provided by the pod battery 109. The drone batteries may only activate once the voltage of pod battery 109 has dropped below a certain predetermined safety threshold that indicates it may no longer provide sufficient power. If the drone battery needs to be recharged, it may receive a charge from pod battery 109 whenever the pod battery voltage is larger.

FIG. 3a shows a wiring diagram for a pod-drone unit 201 according to one embodiment of the present invention. Whereas FIGS. 3b and 3c shows various angles of wiring for a pod unit 100 according to one embodiment of the present invention. Irrelevant portions have been drawn in dotted lines to increase viewability of relevant parts. The pod has two cables, a first cable 304 and a second cable 305, connected to pod battery 109 and traveling up the rear corners of pod 100 (to avoid collisions with the pod behind with four pod drones), and, in this example, are shown connecting through rear pod latches 101 and 104 and to drone latches 224 and 225, once latched, and finally to the cables on the struts of the drone. In this embodiment, the purpose of the two cables 304 and 305 is redundancy for increased safety and reliability. Designers may prefer to link via separate connectors on the roof of pod 100. The two identical cables 304 and 305 each comprise a power line and a ground return, totaling two of each—a first powerline 301a in first cable 304, and a second power line 301b in second cable 305; and a first ground return 302a in first cable 304, and a second ground return 302b in second cable 305. Power lines 301a and 301b go to the front and back motors on both upper and lower sides. At each motor, they provide power to two motor driver-circuits duplicated, with their own control signals and outputs linked together at the motor terminal. This ensures full power line redundancy from pod battery 109 all the way to each drone motor terminal.

Pod control box connection cables 306 and 307 may connect to the front latches of pod 100 to provide a means to connect the pod control box to the drone control once latching has occurred. This is to create a wired interface between pod and drone for communication purposes, and may be augmented by a wireless connection for dual redundancy.

Figure 4:
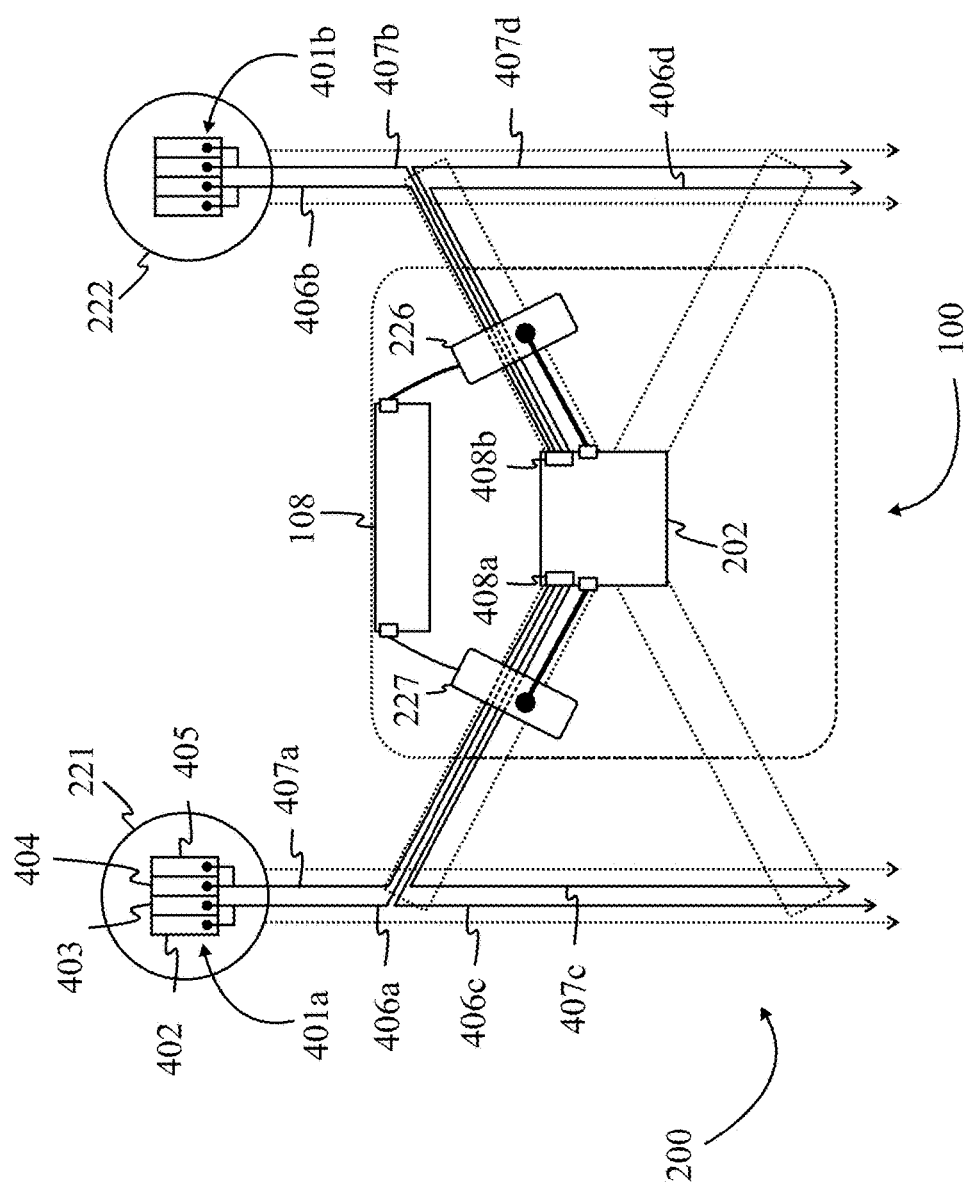
FIG. 4 is an in-depth top view of a transport drone with an attached pod with a wiring layout according to one embodiment of the present invention.

FIG. 4 illustrates a portion of a pod-drone unit 201 showing pod control box 108 and drone control box 202, and a wiring layout according to one embodiment of the present invention. The drone control box 202 is powered from the drone's battery, via two cables, one on each of the diagonal struts, for dual redundancy.

For redundancy, both pod and drone control boxes 108 and 202 include identical controls for navigation, communications, and transport. Differences may include pod control box 108 having a display for a passenger, and drone control box 202 may have eight identical pairs of digital motor control pulse pairs that connect, by wires 406a to 406d and 407a to 407d, to motor driver circuits 401a and 401b present at each corner. Motor driver circuits 401a and 401b may comprise a lower motor left driver circuit 402, a lower motor right driver circuit 403, an upper motor left driver circuit 404, and an upper motor right driver circuit 405. Although only one set of driver motor circuits is individually labeled, and two sets illustrated in FIG. 4, it should be understood that the same arrangement of driver circuits may be found in all four corners of drone 200 as denoted by 401a and 401b, with theoretical 401c and 401d. As with the power lines, there is full dual redundancy between the two control boxes 108 and 202 and also the drive signal pairs from drone control box 202 to each of the 8 motor control terminals. These signals then drive the digital motor controller.

During normal operations drone control box 202 may be considered the master controller provided both box control signals are identical. If a difference is detected both control boxes work together to determine which one is functioning correctly and that control box assumes the role of master device. Similar systems are presently in use on airplanes.

Multi-Pod Drones

FIG. 5a shows a proposed 4-pod drone 500, also called a quad-pod drone, according to one embodiment of the present invention. The design is similar to 1-pod drone 201 but with capabilities of latching to and transporting up to four individual pods, being a first pod 100*a*, a second pod 100*b*, a third pod 100*c*, and a fourth pod 100*d*, one behind the other. Each set of latches may be individually controllable so any of the pods may be released without effecting the latching of other pods. So, it is not necessary that all four pod positions be utilized. A drone control box 501 of 4-pod drone 500 is located above front pod 100*a*. Motor-rotor pairs, 506 to 509 of 4-pod drone 500 may be larger than those found on the 1-pod drone 200 to enable 4-pod drone 500 to carry three extra pods, and may also enable it to travel at greater speed. The 1×4 configuration may result in less air resistance than a 2×2 configuration or even a 4×1 wide configuration because the back three drones 100*b* to 100*d* are sheltered behind first pod 100*a*. A wind screen may additionally be fitted on drone 500 in front of first pod 100*a* to reduce air resistance to first pod 100*a*. Pods 100*a* to 100*d* may be designed to bounce air away from a pod directly behind them, creating a vacuum effect between the pods. The 1×4 configuration may also make balancing drone 500 in flight easier.

In other embodiments of the present invention, it may be possible for additional dual motor-rotor units to be placed in between the front and rear dual motor-rotor units to offer drone 500 more redundancy, higher speed potential, and better lifting capability.

FIG. 5*b* is an illustration of a segment of 4-pod drone 500 with a wiring layout according to one embodiment of the present invention. All four batteries 109*a* to 109*d* from the four connected pods 100*a* to 100*d* may be connected in parallel with power cables 502*a* 502*b* 503*a* and 503*b* for redundancy inside the struts of drone 500, and are protected in each battery compartment from any other battery voltage dropping due to failure.

Control circuitry for 4-pod drone 500 is similar to the circuitry of 1-pod drone 200 shown in FIG. 4. This may significantly simplify the design of the 4-pod controller. The control algorithms for 4-pod drone control box 501 may be different, but the navigation, communications, and transport control may be the same. Additionally, the 4-pod drone control box 501 must communicate with up to 4 pod control boxes present in each of connected pods 100*a* to 100*d*. With good planning and design, it may be possible for the 1-pod and 4-pod control boxes to be identical, for example, with the presence of an input wire or multiple wires for detecting what kind of drone a pod is connected to. Maybe with some communication control information exchanged as well.

Although single-person pods may have advantages, such as versatility, cross-operation with abovementioned 1-pod drones or 4-pod drones, and allowing passengers to remain in the same pod throughout their journey, some passengers may prefer to travel with others in the same pod. For example, families, or just couples with luggage, or small groups, or to have a meeting while traveling, or even just to be with other people. As such, there may be a need for multi-person pods. Multi-person pod 602, as seen in FIG. 6*b*, may be a detachable unit similar to a single-passenger pod 100 found in the 1-pod or 4-pod drone embodiments, or the drone and pod may be a semi-permanently attached unit only removed for replacement or maintenance. FIGS. 6*a* and 6*b* show an 8-person pod 602 and drone 601 attached to create a complete pod-drone unit 600 according to one embodiment of the present invention. Seating may be arranged in a 2×4 formation with an aisle down the middle with four seats on each side. Pod-drone unit 600 may require larger motors and rotors, or may just employ a greater number of motors and rotors situated in between the four motors present at the corners of drone 600. In this embodiment, multi-person pod 601 is detachable as shown in FIG. 6*b*, but in uses where there is no advantage, multi-person pod 601 may be an integral part of drone 600 and is only detached to be replaced or for maintenance purposes. Multi-person pod 601 may have batteries underneath each seat similar to pod 100, as this saves space and ensures stability in flight with the center of gravity lower in the overall structure. The batteries will still need to be charged, and the pod may use identical receptacles and chargers as those found on single passenger pod 100. This may allow multi-person pod drones to be charged along-side 1-pod and 4-pod drones on predetermined drone pathways at the same charging stations.

Exchange Stations

An exchange station enables 1-pod drones, from the suburbs or other low usage areas, to link up with higher speed 4-pod drones going to a next exchange station. Exchange stations may also provide an ability for pods to change from one 4-pod drone to another 4-pod drone to fly to another exchange station onwards and eventually switch back down to a 1-pod drone to fly to a final destination. Exchange stations also accept passenger entry and exit through a passenger terminal, as well as parcel management, with full intermixing of parcel pods with passenger pods.

Figure 7A:
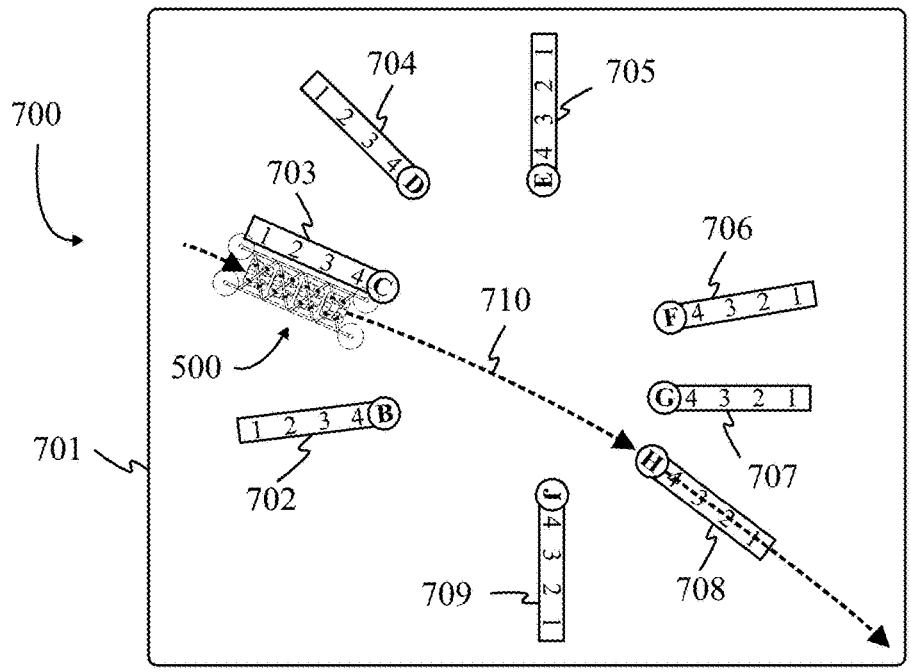
FIG. 7a is an illustration of an exchange stations with a plurality of loading bays and one potential flight path when wind is negligible of a transport drone according to one embodiment of the present invention.

FIG. 7*a* is an illustration of an exchange station 700 using 4-pod drones 500 with an example travel route 710 according to one embodiment of the present invention. Although only a single 4-pod drone 500 is shown, it should be understood that there may be a plurality of drones, both 1-pod drones and other 4-pod drones, flying in or around the vicinity of exchange station 700 throughout usual operation. This embodiment comprises eight loading bays 702 to 709, but it may be possible to have exchange stations of various numbers of loading bays, for example an exchange station in a low traffic area may have fewer loading bays and vice versa. Although exchange station 700 in this embodiment is circular in shape, as shown by illustrated boundary 701, in some cases it may take other shapes in order to fit in a particular space or to maximize efficiency. Each loading bay 702 to 709 may have any combination of other features of an exchange station such as a passenger terminal with an associated transit bay linking it into the present exchange station, a 1-pod drone bay where both empty pods and 1-pod drones may be stored, a 4-pod drone bay for empty 4-pod drones, a charging bay which may be a part of the transit bay which may include a rest area for any passing drone that needs charging, and an optional parcel bay where parcels may be brought in or taken out at any time.

There may be a backup reserve loading bay present at each loading bay in case the primary one is still loading while another drone is instantly arriving at the same loading bay. Another example may be the primary loading bay has already been offloaded with three pods and another drone is arriving with two, three, or four connected pods going to the same exchange station.

A loading bay may face its corresponding target exchange station to eliminate any need to turn towards the target exchange station on take-off, unless there is a strong wind, such that a loaded 4-pod drone may take off without interfering with other drones which may be also taking off.

As mentioned previously, being small flying machines, drones may be affected by the weather more than other forms of transport. As drone transport gains popularity, people may still require to get from one point to another using drones and this will put pressure on system operators to maintain a continual flow of drones in less than ideal conditions. The main constituent of weather that affects drones may be wind. It may be assumed that as machine intelligence becomes more advanced, that even the first passenger drones may be able to fly in conditions with poor visibility, such as, but not limited to, heavy rain, snow, and total darkness. However, they may still be affected by wind. Up to a certain wind speed, drones may simply fly at an angle relative to the direction of travel to maintain the correct course. As drone technology progresses, this minimum safe wind speed may increase. Gusts of strong wind may make flying even more difficult, and in some extreme conditions, a system shutdown may be unavoidable.

Figure 7B:
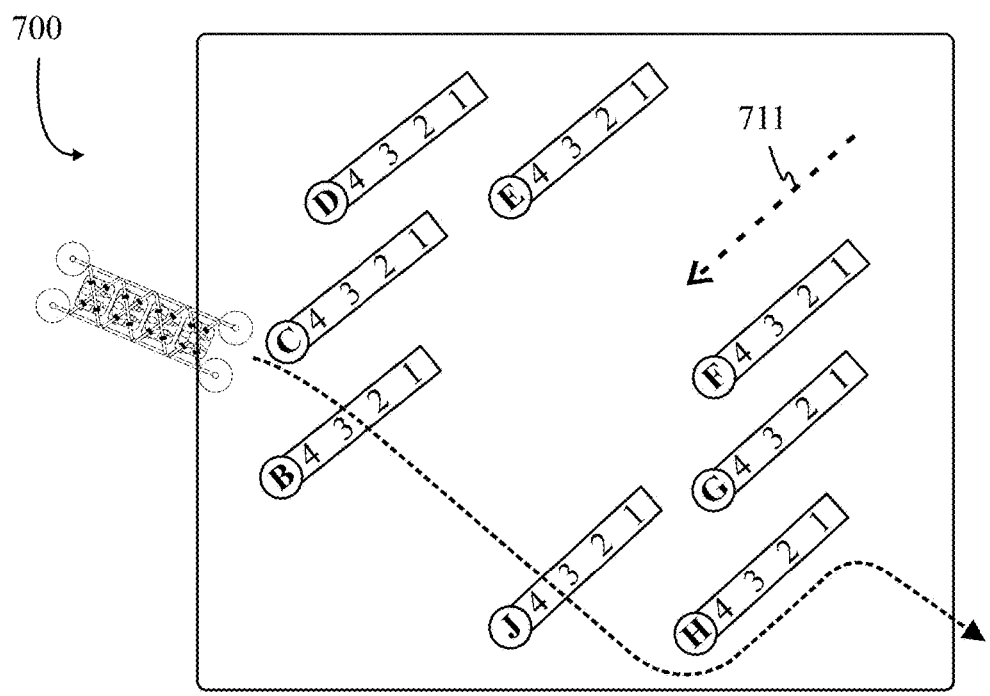
FIG. 7b is an illustration of an exchange stations with a plurality of loading bays and one potential flight path with significant wind according to one embodiment of the present invention.

Landing and taking off may be the most dangerous part of flying, and may also be the part that is most impacted by strong, gusty crosswinds. For this reason, it may be necessary to allow loading bays 702 to 709 to be rotatable into the wind. FIG. 7b shows an embodiment of the present invention in which loading bays 702 to 709 are rotatable relative to wind 711 indicated by a dashed arrow so that impact of the wind on drones taking off or landing is lessened and more easily manageable.

Other embodiment examples of potential exchange station types and layouts are presented and explained in greater detail below.

Drone Transport System

Figure 8:
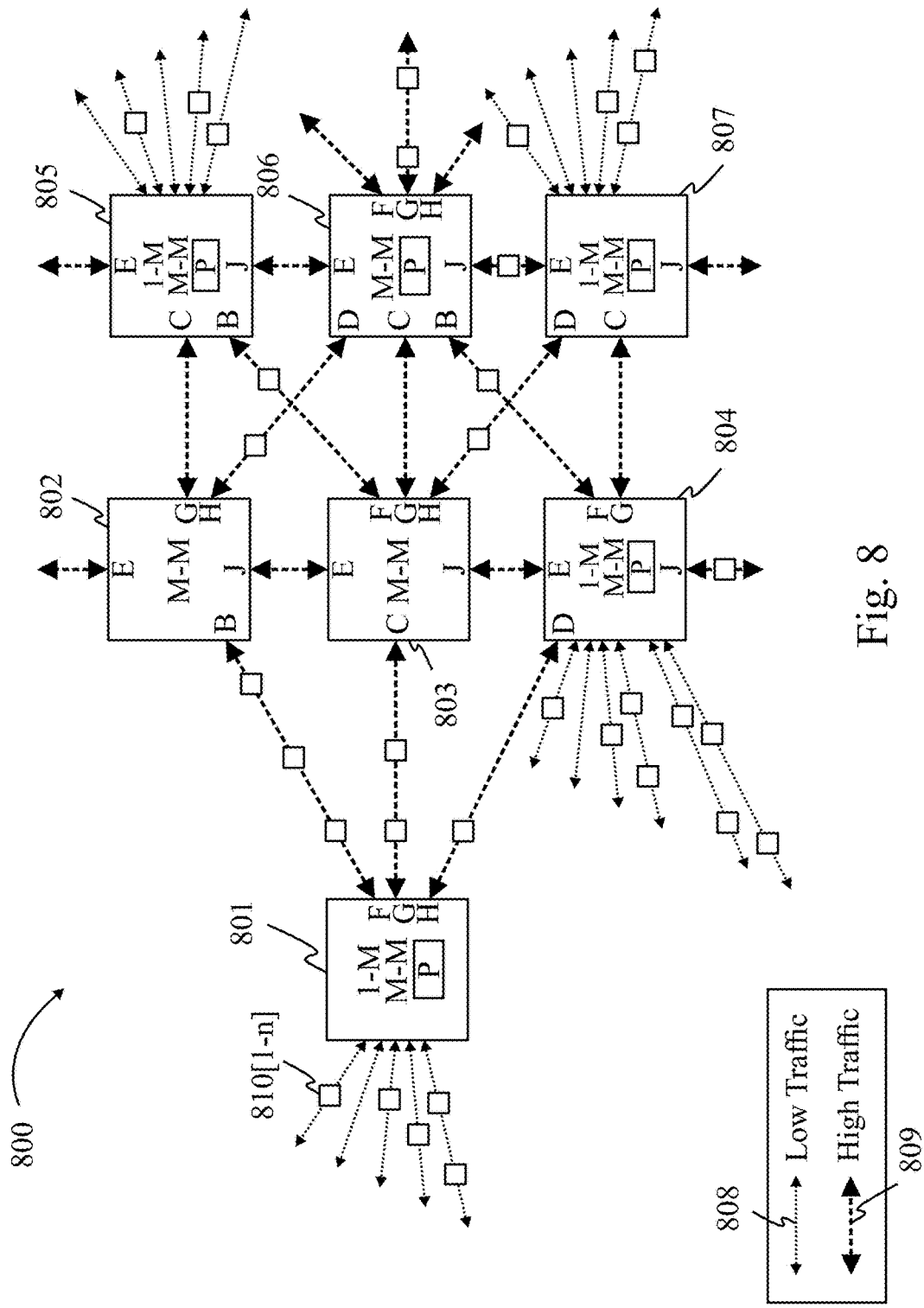
FIG. 8 is an illustration of a segment of a wider system with a plurality of exchange stations interconnected by various flight paths according to one embodiment of the present invention.

FIG. 8 illustrates an example segment 800 of a wider system of stations in which 1-pod drones and 4-pod drones may be interconnected in a typical city according to one embodiment of the present invention. System segment 800 comprises a plurality of exchange stations 801 to 807, which are explained in further detail below, interconnected with drone pathways denoted by arrows. A smaller, dotted arrow 808 may be lower traffic volume, and more regulated drone flight paths, intended mainly for 1-pod drones. A thicker, dashed arrow 809 may be higher traffic volume, with a higher speed limit for drone flight paths that may be utilized by any drone type.

Exchange stations may not necessarily be capable of accepting all types of drones. In example segment 800, exchange stations are annotated with their capabilities. A "1-M" indicates that that particular exchange station is capable of accepting 1-pod drones, and may transfer the pod carried by the 1-pod drone to a loading bay with other pods to be picked up by a multi-pod drone. A "M-M" indicates that that particular exchange station has facilities to accept multi-pod drones, and can transfer pods to various different multi-pod drones. A "P" indicates that that particular exchange station has facilities for parcel pods. Letters around the inner edges of each exchange station indicate loading bays.

This embodiment of segment 800 employs multi-pod drones up to 4-pod drones 500. It may be that 1-pod drones 200 and 4-pod drones 500 will be introduced first into the system, and as technology, reliability, and experience improves, drones of increasing size and complexity may be introduced and may utilize the same system and infrastructure.

Along the way, between exchange stations 801 to 807, a plurality of charging stations 810[1-n] may be strategically placed in order to allow drones to travel longer distances between exchange stations 801 to 807 or between residences or offices and other exchange stations.

It is not required for drones to stop at any particular exchange station if a drone has enough charge to venture to a next exchange station on a pre-determined path. For example, a 1-pod drone may decide to bypass an exchange station if its occupant wants to travel alone, or owns a private pod or even a private drone. Or instead, the occupant may want to stop and just take a break, while charging the drone's and pod's batteries in a charging bay. Similarly, a 4-pod drone may decide to bypass an exchange station if its occupants are all heading to a common next exchange station. Because the drone system knows the drone does not need to visit the upcoming exchange station, occupants may receive a prompt on the screen in their pods to check whether or not they wish to stop to just take a break and charge the drone's and pod's batteries in a charging bay.

Exchange Station Types

There are two basic types of exchange station proposed here where incoming drones may offload their occupants at each pre-determined target loading bay, or incoming drones may offload their pods at a pre-determined arrival bay dock, from which the pods may be directed automatically to transfer along pre-determined transfer paths to their target loading bays. These are just a few potential embodiments, and it should be understood that various types may be mixed and used in a single system.

Drone Offload Exchange Station

Figure 9:
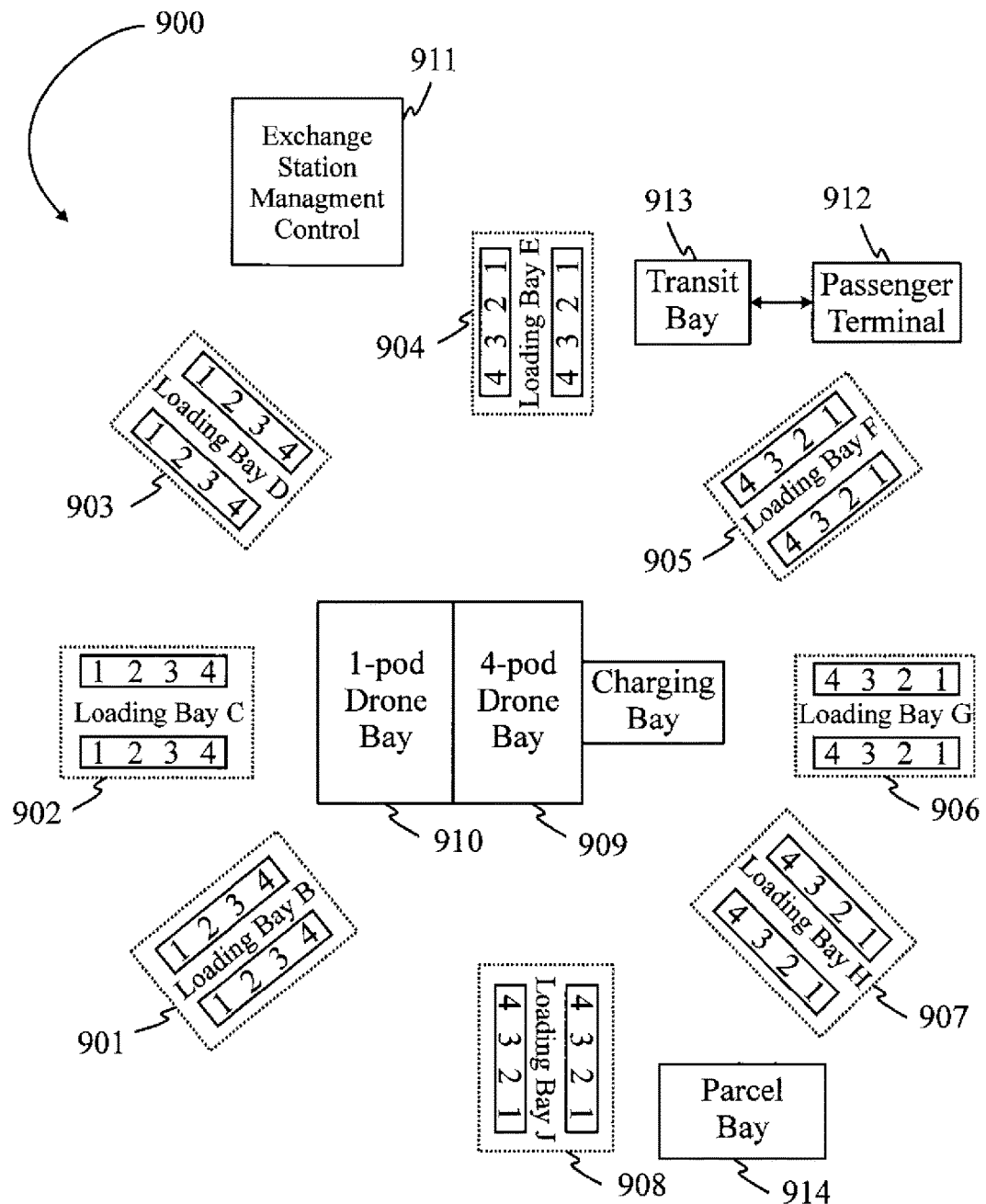
FIG. 9 is an illustration of a drone offload exchange station according to one embodiment of the present invention.

FIG. 9 shows a drone offload exchange station 900 according to one embodiment of the present invention. Drone offload exchange stations may be smaller, less complex exchange stations for drone and pod pickup and drop-off. They may be located on the periphery of a city, such as in the suburbs, or just a small town where there may only be few connecting exchange stations.

Drone offload exchange stations comprises a set of loading bays, eight are illustrated in FIG. 9, loading bay B 901, loading bay C 902, loading bay D 903, loading bay E 904, loading bay F 905, loading bay G 906, loading bay H 907, and loading bay 908. Each loading bay 901 to 908 may have one or more separate loading docks for drones to drop off pods. Backup docks may be implemented in exchange stations that expect a higher volume of drone traffic enable multiple drones to drop-off pods simultaneously. It should be understood that although eight loading bays are illustrated in this embodiment, it may be possible to have as few or as many loading bays as needed as space allows. Loading bays may be arranged in such a fashion that they may be located towards the direction of respective exchange station designation. This may reduce the number of flight path crossing as drones take off and fly to their designated exchange stations. Drones may land at a target loading bay, and after offloading all pods, may park in a designated drone parking area, a 4-pod drone bay 909, or a 1-pod drone bay 910. This embodiment only utilizes one of each drone bay, but it may be possible to have as many as needed to provide space for drones that may be on standby. In a future embodiment in which drones of various shapes and sizes are introduced, there may be more parking areas designated for each drone type, or one area may be designated for mixed drone parking.

Passengers intending to commute by drone may be processed through a passenger terminal 912 where they may check-in, purchase tickets, or request any special arrangements such as having luggage they may need to transport as well. Some exchange stations may need a security check From passenger terminal 912, a passenger enters a transit bay 913 to enter a pre-charged pod designated to them while processing through the passenger terminal, and to wait to be transferred to a loading bay with other pods heading to a similar next exchange station.

An exchange station management control system 911 may wirelessly communicate with drones flying in its vicinity and control the flow of drones to and from each loading bay as well as to and from each parking area. It may be difficult and somewhat risky to allow more than one incoming drone to be flying around offloading at the same time. A sequential method may be used to simplify logistics: only when a drone has finished offloading can a new drone enter the exchange station. Drone offload station 900 may be suited for smaller stations that are not expected to be very busy, such as in the suburbs where commuters may call up drones for transport from home to work and back to home, or for sub-exchange stations in work areas or shopping malls where passengers may enter or exit close to work or shopping areas. With careful layout of the bays etc. it should be possible to upgrade fairly easily to an arrival bay type of exchange station if for example the station gets busier over time.

As an example, an incoming first 4-pod drone from a neighboring exchange station may descend to a certain height above the ground and hover over a first loading bay, drop down to ground, unlatch the relevant pod or pods, and fly to a next loading bay, offload more pod or pods, and repeat for as many different loading bays as needed to put all pods where they are designated to go, and may finally park itself in a predesignated parking spot or may dock for charging. A second 4-pod drone, arriving while the first drone is still offloading, may have to wait until the first one finishes before it may start its offloading procedure. This is because the second drone may be arriving from a different direction and may conflict with the first drone while offloading at the same loading bay. This forces incoming drones to be only offloaded sequentially, which slows the offloading down. And offloading itself may not be quick, because each time a drone offloads it must ascend to a safe altitude, fly to the next loading bay, drop to ground level, unlatch, and ascend again, etc.

A parcel bay 914 may be present as an area accessible to only qualified staff and personnel. This area may be designated for the loading and unloading of pods carrying parcels to be transported by drones to other exchange stations in order to reach a final destination.

Figure 10:
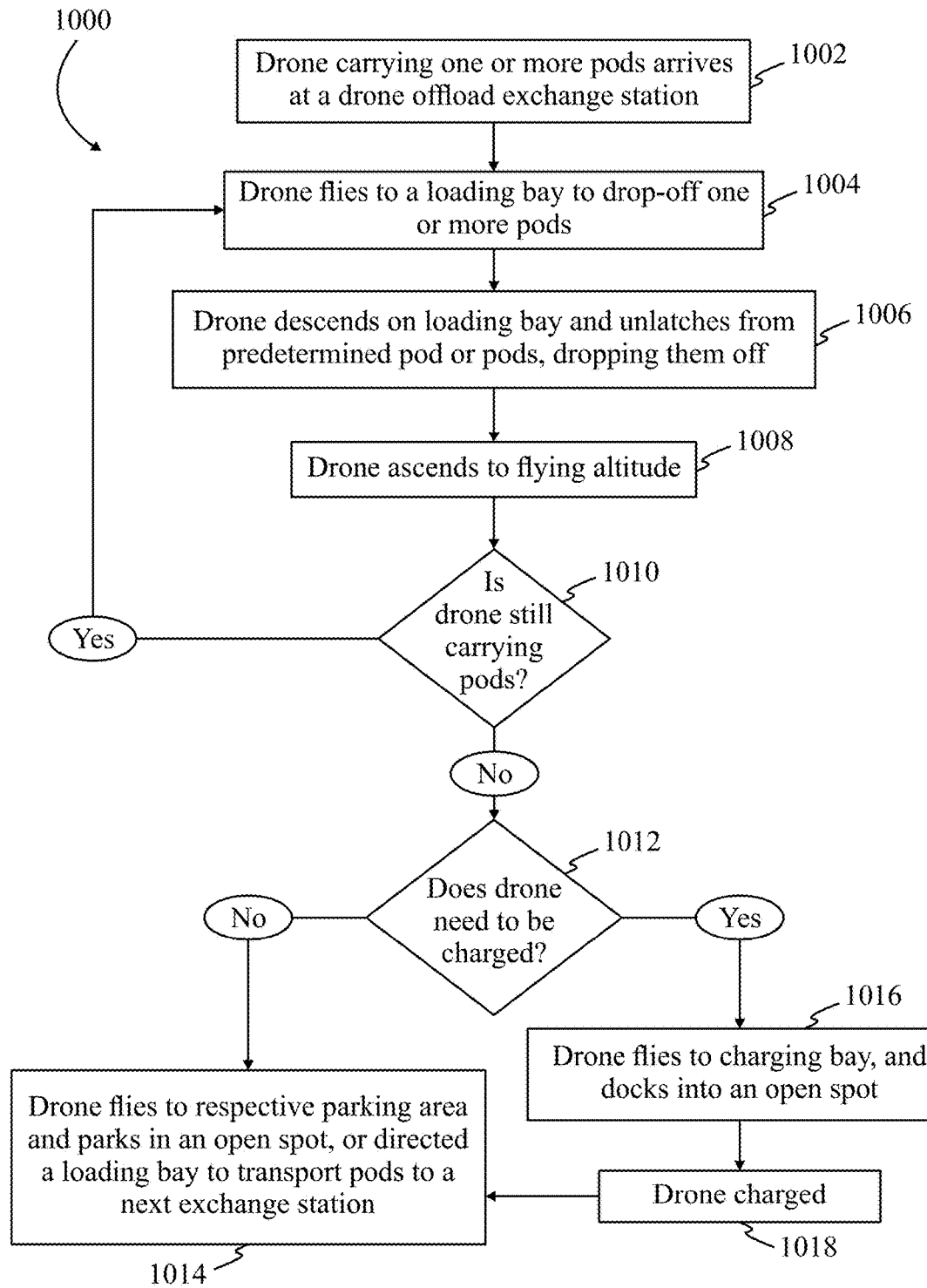
FIG. 10 is a flowchart of a method for arrival and unloading of a drone carrying pods at a drone offload exchange station according to one embodiment of the present invention.

FIG. 10 is a flowchart 1000 of a method for arrival and unloading of a drone carrying pods at a drone offload exchange station according to one embodiment of the present invention. The process is similar for both 1-pod and 4-pod drones. At step 1002, a drone carrying pods arrives at a drone offload exchange station. At step 1004, the drone flies towards a first loading bay where it may drop off one or more pods. For efficiency purposes, incoming drones may unload pods in loading bays in ascending order according to slot numbers of their respective loading bay dock as shown in FIG. 9. In some cases, drones may drop off pods at a transit bay instead of a loading bay if a passenger in a pod has his exchange station as their final stop. In another case, if a passenger is flying to their final stop after the present exchange station, the pod may be dropped off at a 1-pod drone bay to catch a drone to their final stop.

At step 1006, the drone descends on the first loading bay and unlatches from pods that are designated for drop-off at the present loading bay. At step 1008, after unloading of pods is completed at the present loading bay, the drone ascends to a safe flying altitude. At step 1010, if the drone is still carrying pods, the process may return to step 1004 and repeat steps 1004 to 1010 for as many different loading bays as necessary to drop off all pods. Once pod drop-off has been completed, step 1012 is reached, and a quick analysis is performed to decide whether the drone needs to be charged. If the power supply is at sufficient levels, the drone may be directed to park in a respective drone bay. In the case in which no other drone is available, the drone may be directed by exchange station manage control to a loading bay to pick up pods to fly to a next exchange station.

Returning to step 1012, if a charge is needed, step 1016 is reached, and the drone may be directed to a charging bay, and docks into an open spot to receive a charge. Step 1018 is reached when the drone has received a sufficient charge, which leads back to step 1014.

Figure 12A:
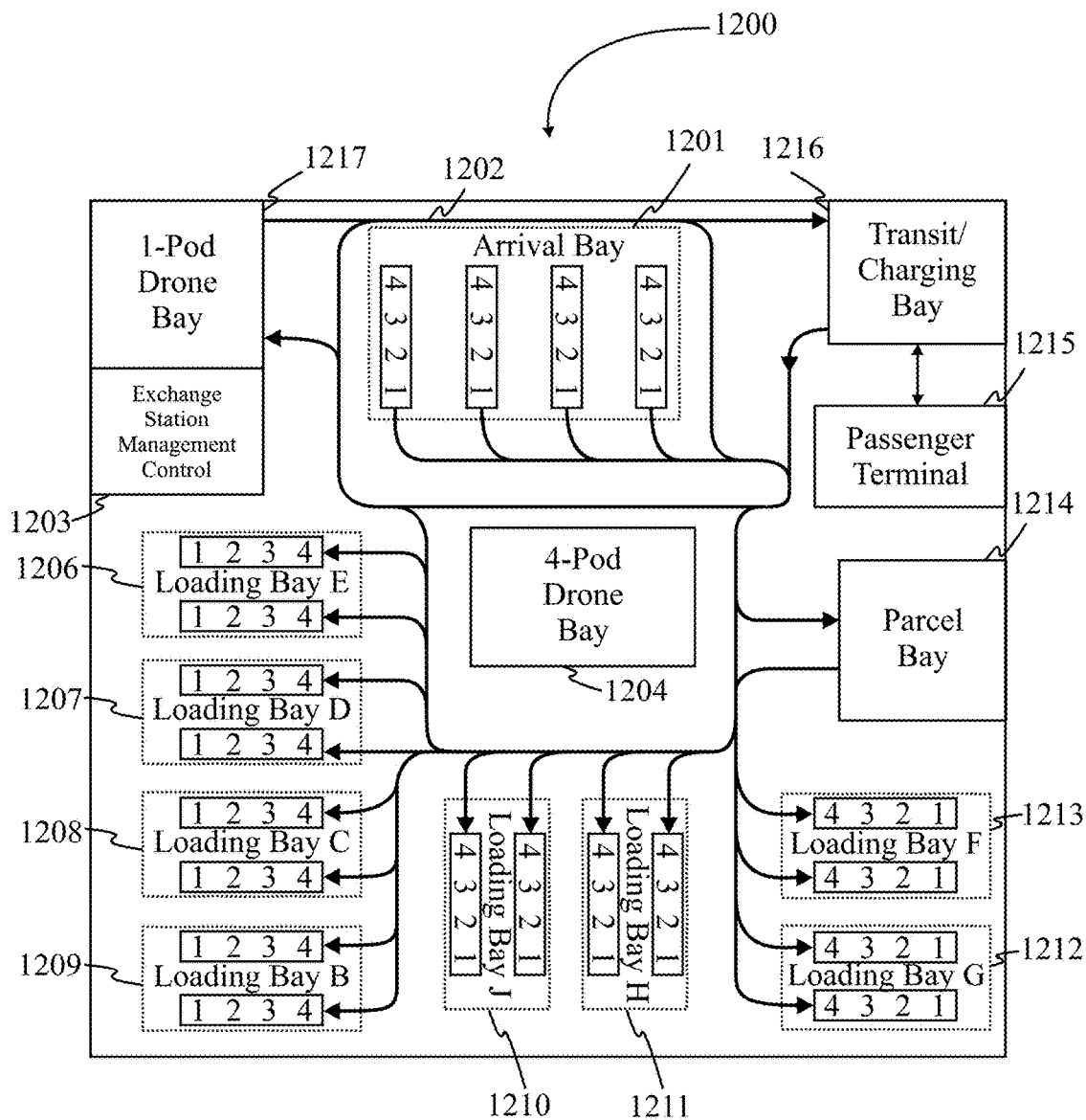
FIG. 12a is an illustration of an arrival bay exchange station 1200 according to one embodiment of the present invention.
Figure 12B:
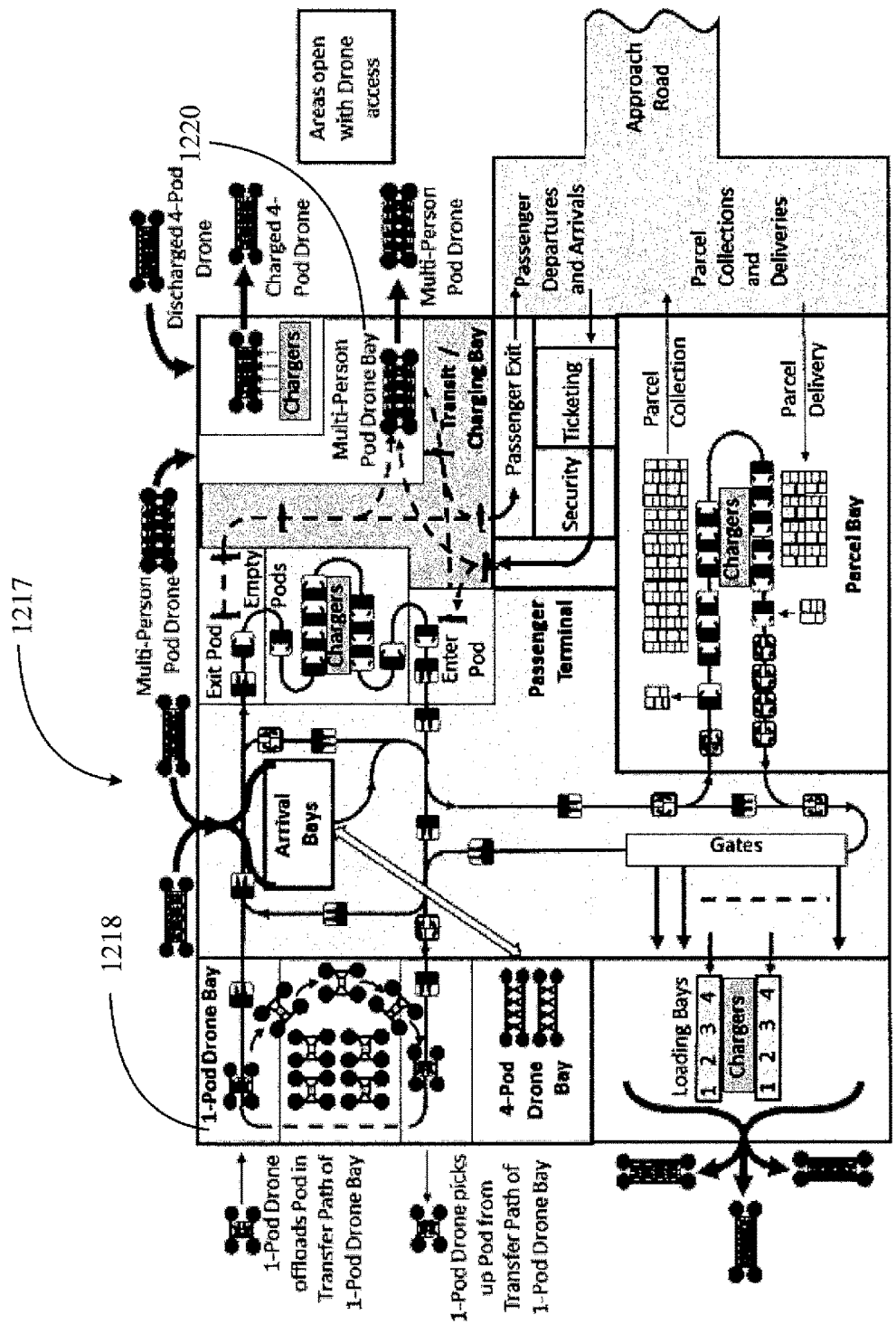
FIG. 12b is an illustration of an arrival-bay exchange station in another embodiment of the invention.

In another embodiment of the invention, pods waiting in loading bays may be charged there, and each loading bay pair will have a quad charger in this variation, similar to that in the charging bay. Charging will take a few seconds at most to fully charge. This is a convenient and fast way to fully charge a departing drone. Pod batteries if already partially charged, recharge until full then charging stops, so it doesn't matter if all four discharged pods have different charges. This is also valid for arrival bay exchange stations. Also for 1-pod drones departing, charging the pod batteries should be done in the 1-pod parking bay as shown in FIG. 12b. Pods may also be charged in the parcel bay. Control of drones throughout the process may be handled by communications between the controller of the drone, as explained above, and an exchange station management control system that may be present at all exchange stations.

Figure 11:
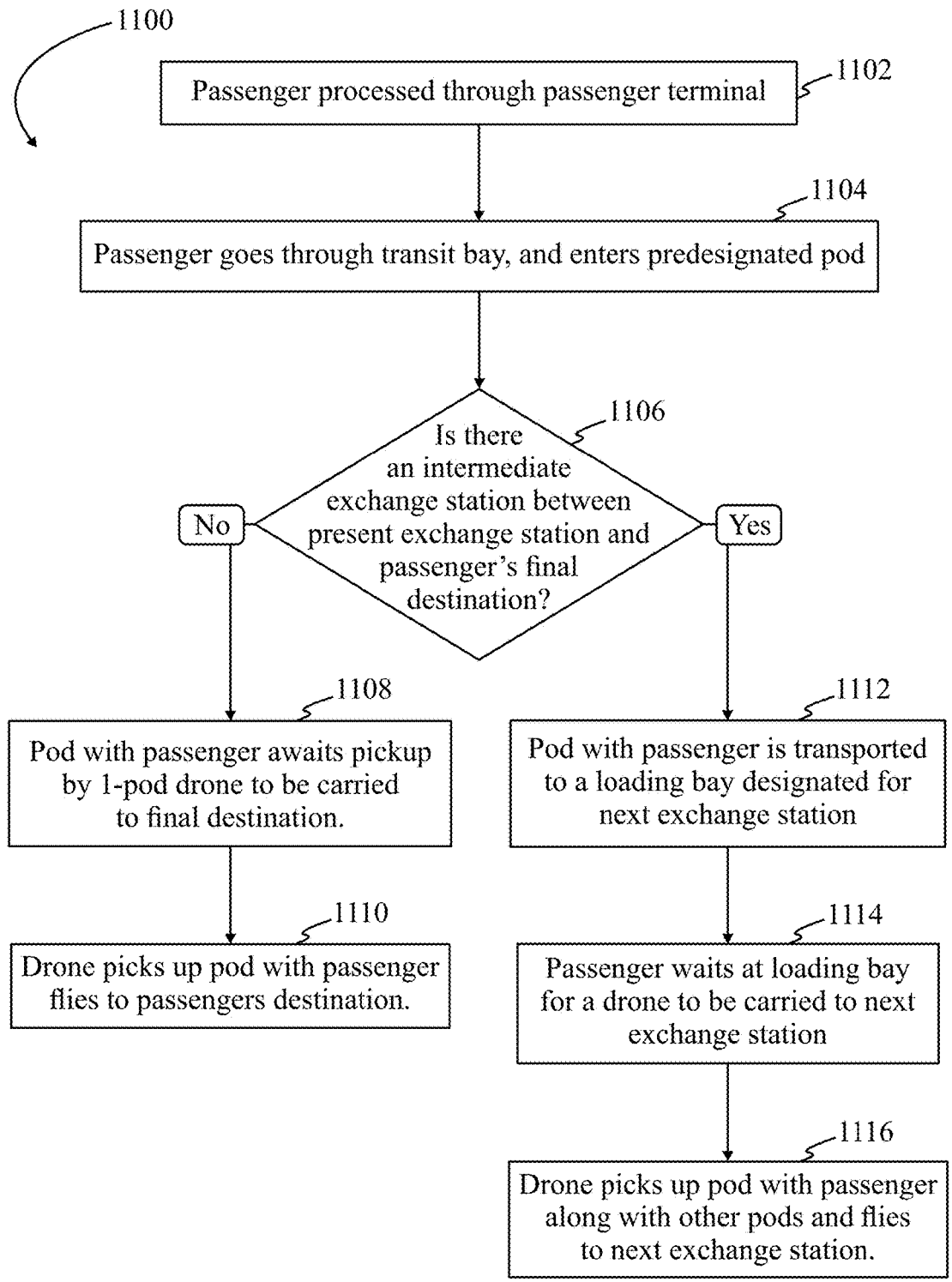
FIG. 11 is a flowchart of a method for new passengers entering a drone offload exchange station through a 1-pod drone bay or a passenger terminal according to one embodiment of the present invention.

FIG. 11 is a flowchart 1100 of a method for a new passenger entering a drone offload exchange station according to one embodiment of the present invention. The steps detailed herein are in the case of a passenger using a public pod, and may not cover the case in which a personal pod is used. At step 1102 a passenger is processed through a passenger terminal. Passenger terminals may be similar to those found at airports or train stations. Tasks completed at a passenger terminal may include, but may not be limited to, purchasing tickets, checking-in if tickets have been pre-purchased, or checking-in luggage. Once processed, step 1104 is reached, and the passenger goes to the transit bay, and enters a pre-charged pod designated to them during check-in or ticket purchase. At step 1106, if there are no exchange stations between the present station and the passenger's final stop, step 1108 is reached, and the pod carrying the passenger waits at the transit bay to be picked up by a 1-pod drone. At step 1110, the pod carrying the passenger is picked up by a 1-pod drone and carried to the passenger's final stop, and the drone and pod return to the same 1-pod drone bay.

Returning to step 1106, if there is a next exchange station on the passenger's itinerary step 1112 is reached, and the pod is transferred to a loading bay designated for the next exchange station. At step 1114, passenger waits for the loading bay to fill up with other pods, or a pre-established wait interval has passed. Other pods that may fill up a loading bay may be other passengers, or pods carrying parcels. If there are not enough parcel pods or passenger pods to fill up a loading bay, a brief wait time may be implemented to prevent unnecessary delays for passengers caused by waiting for the loading bay to fill up. As explained above, a 4-pod drone may carry any number of pods up to the maximum amount of 4 in this embodiment. At step 1116, a drone comes to pick up pods at the loading bay and flies to the next exchange station.

Arrival Bay Exchange Stations

For a higher volume of drone traffic a more complicated exchange station type may be required. FIG. 12a is an illustration of an arrival bay exchange station 1200 according to one embodiment of the present invention. Exchange station 1200 may have features and structures that may be found in a drone offload exchange station 900, such as, a 1-pod drone bay 1217, an exchange station management control post 1203, a transit and, charging bay 1216, a passenger terminal 1215, a parcel bay 1214, a 4-pod drone bay, and a plurality of loading bays 1206 to 1213. Also, similar to drone offload station 900, arrival bay exchange station 1200 in this embodiment illustrates eight loading bays with a pair of docks, but it should be understood that more or fewer loading bays may be used, space permitting, and the number of docks may also be adjusted depending on usage need. The major difference, regarding features, between arrival bay exchange station 1200 and drone offload exchange station 900 may be the presence of an arrival bay 1201, and a transfer path 1202 used for transferring pods around the exchange station.

Incoming drones descend onto an available dock in arrival bay 1201 selected by an exchange station management control system 1203, and unlatch from carried pods. In this embodiment, four 4-pod drones may offload pods simultaneously in any of the four arrival bay docks of exchange station 1200. The emptied drone then takes off and may be directed to either pick up pods at a waiting, loaded, loading bay to fly to a next exchange station, or, if none are waiting, to a 4-pod drone bay 1204 where they may be on standby to be activated to pick up pods at a waiting loading bay. The offloaded pods are then individually and automatically carried along transfer path 1202 to their target loading bays. The path from arrival bay to loading bay may be as fast as the exchange station requires. For example, larger and busier exchange stations may need a faster transfer rate to cut down on wait time for incoming drones and pods.

Once an incoming drone has taken off from the arrival bay 1201, the pods may be shifted forwards out of arrival bay 1201 onto the transfer path 1202. The occupants may face their direction of travel down the transfer path which may minimize discomfort during pod transferring. Once the pods have left arrival bay 1201 they then are guided by open and closed gates or some other method to a target loading bay. The pods may use an on-board collision avoidance system to indicate to its own controller that ensures a safe distance is maintained from either the pod in front, or from a pod joining the path. It is likely the local exchange station management control 1203 may also be involved in ensuring safe conditions are maintained. There are a variety of arrangements that may be incorporated to facilitate movement of pods along transfer paths. In some cases, the pods may have wheels, which may or may not be retractable. In other embodiments, there may be rails similar to narrow gauge trains, and the pods may be enabled to ride on the rails and be gated through intersections along the transfer paths. In some embodiments, pods may be self-powered, and in others, there may be means external to the pods to move the pods along the transfer paths.

This embodiment utilizes an architecture designed so that no transfer path crosses another, which allows for the terrain to be flat, as well as to minimize delays. It may be good planning to have arrival bay 1201 on slightly higher ground so that gravity can be utilized to assist in guiding pods to a respective target loading bays further down a slope, similar to a bobsleigh ride.

Once a loading bay has one last pod incoming to fill it or a pre-established wait time has passed, and in either case the pods are fully charged an empty drone from 4-pod drone bay 1204 takes off and flies to above the present loading bay. The empty 4-pod drone descends to the pods, latches onto them and ascends, flying on to the designated next exchange station.

In addition, passengers may enter exchange station 1200 via passenger terminal 1215, where after being processed through passenger terminal 1215, they are led to transit bay 1216. The passenger enters a designated pod and may be transferred by transfer path 1202 to a target loading bay, or may be taken by a fully charged pod from the transit bay to 1-pod drone bay 1217, where a 1-pod drone may transport the passenger to the next exchange station, or final destination. Fully charged parcel pods may also transfer by transfer path 1202 to a target loading bay. At all times the pods and drones may be under the control of exchange station management control 1203.

With four arrival-bay docks active, there may be sixteen pods traveling from their arrival bay docks to their target loading bays along transfer path 1202. This total does not include pods that may be entering from parcel bay 1214 or 1-pod drone bay 1217, or the transit bay 1216. It should be understood that a busier exchange station may need more arrival-bay docks, so it is well within the scope of the present invention to scale exchange station 1200 and utilize as many arrival-bay docks, and loading bays as needed to cut down on backlog and maintain efficiency, and vice versa if a smaller exchange station is required.

FIG. 12b is an illustration of an arrival bay exchange station 1217 with expanded functionality and flexibility over that described for the exchange station of FIG. 12a. The exchange station of FIG. 12b has at least one 1-pod drone bay 1218, at least one 4-pod drone bay 1219, and at least one multi-person pod drone bay 1220, with pods as seen in FIGS. 6a and 6b. Note FIG. 12b shows a common point of entry for 4-pod drones from the top, whichever direction they may came from. This is to avoid collisions.

In addition, FIG. 12b shows multi-person pods arriving at and departing from the transit bay, where passengers can enter from or exit into the passenger terminal, or enter into or exit from the 1-pod drone bay, or enter into the transfer path to a loading bay, or exit from a transfer path to an arrival bay. The multi-person pods may be charged while in the transit bay by chargers next to the charging bay.

In addition to differences and functions described above, FIG. 12b shows integration of an approach road with portals for arrival and departure of passengers, and for arriving and departing parcels.

In addition, FIG. 12b shows battery chargers that will charge four pod batteries simultaneously in the charging bay, the transit bay, the parcel bay and between each pair of loading bays, to ensure a quick and convenient way of ensuring only fully charged drone exit the exchange station. But also, 4-Pod Drone batteries will sometimes have a need to be charged, and this may be done in the 4-Pod Drone Bay by a smaller charger, and 1-Pod Drones in the 1-Pod Drone Bay by an even smaller charger, with both possibly using the same receptacle as the 1-Pod chargers.

Figure 13:
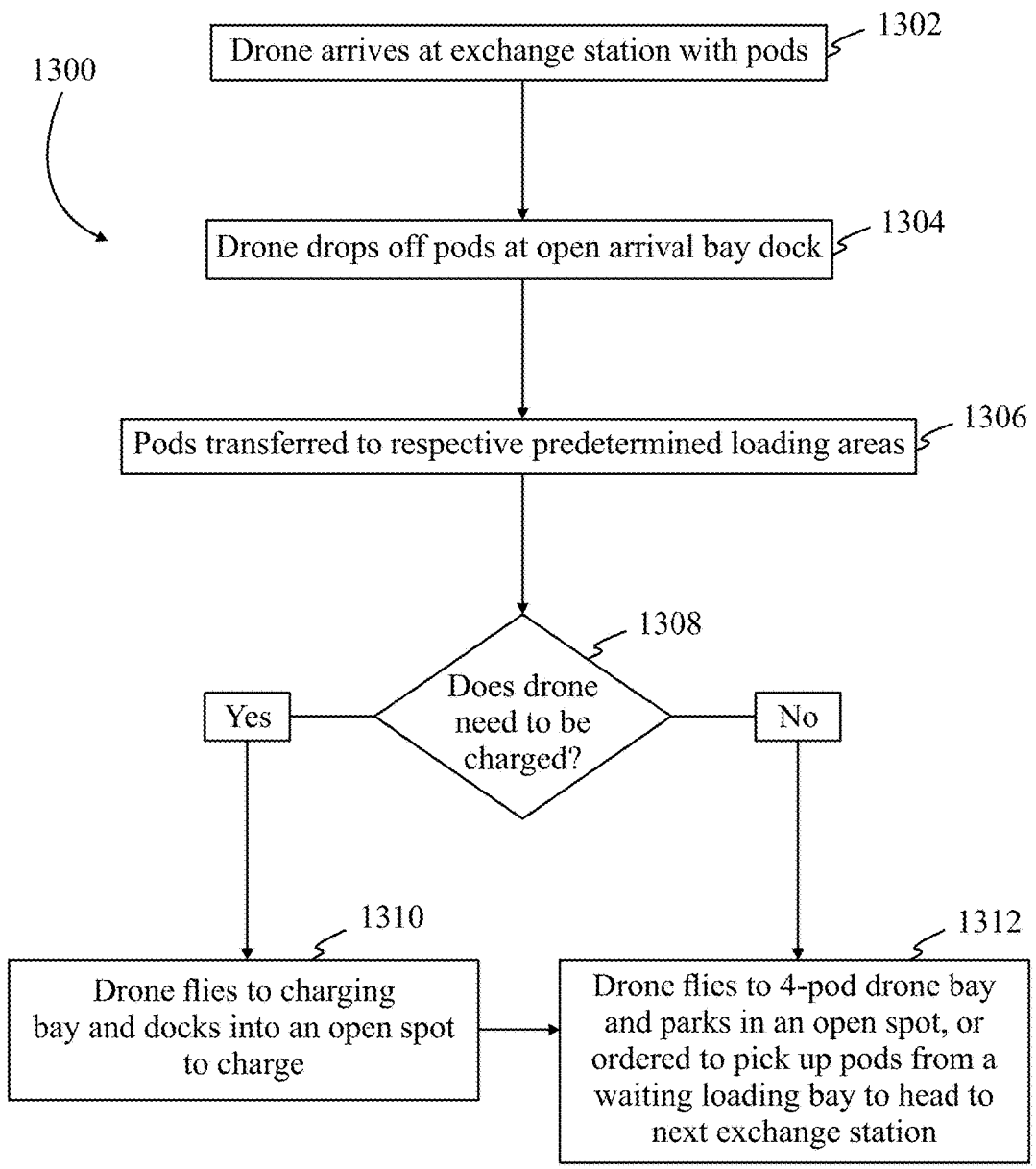
FIG. 13 is a flowchart of a method for arrival, unloading, and transferring of a 4-pod drone carrying pods according to one embodiment of the present invention.

FIG. 13 is a flowchart 1300 of a method for arrival, unloading, and transferring of a 4-pod drone carrying pods according to one embodiment of the present invention. At step 1302, a 4-pod drone carrying pods arrives at an arrival bay exchange station. The 4-pod drone may be carrying between 1-4 pods in this embodiment. At step 1304, the drone flies to an open arrival bay dock and drops off all the pods it is carrying. At step 1306, the pods are transferred via transfer paths to each pod's respective designations. For example, a pod flying to a final stop may be transferred to a 1-pod drone bay to catch a drone to the final stop, while a pod with parcels may be transferred to a parcel bay for processing, or a pod heading to another exchange station may be transferred to a designated loading bay. Or a passenger departing the exchange station will exit their pod in the transit bay and exit via the passenger terminal.

After the drone drops off all pods at the arrival bay, step 1308 is reached, and an analysis of drone power level is done to see whether the drone needs to be charged. If power levels are not sufficient, step 1310 is reached and the drone flies to a charging bay and docks into an open spot to charge. After charging, step 1312 is reached. If there are no drones ready to transport waiting pods, the drone may be directed to a 4-pod drone bay to park itself in an open spot. Otherwise, the drone may be ordered by exchange station management control to pick up fully charged pods from a loading bay to transport to a next exchange station. Returning to step 1308, if a charge is not required, step 1310 is skipped, and step 1312 is reached directly.

In alternative embodiments, chargers may be provided in different bays in the station, and charging may be done, as described above, for example, in loading bays.

Figure 14:
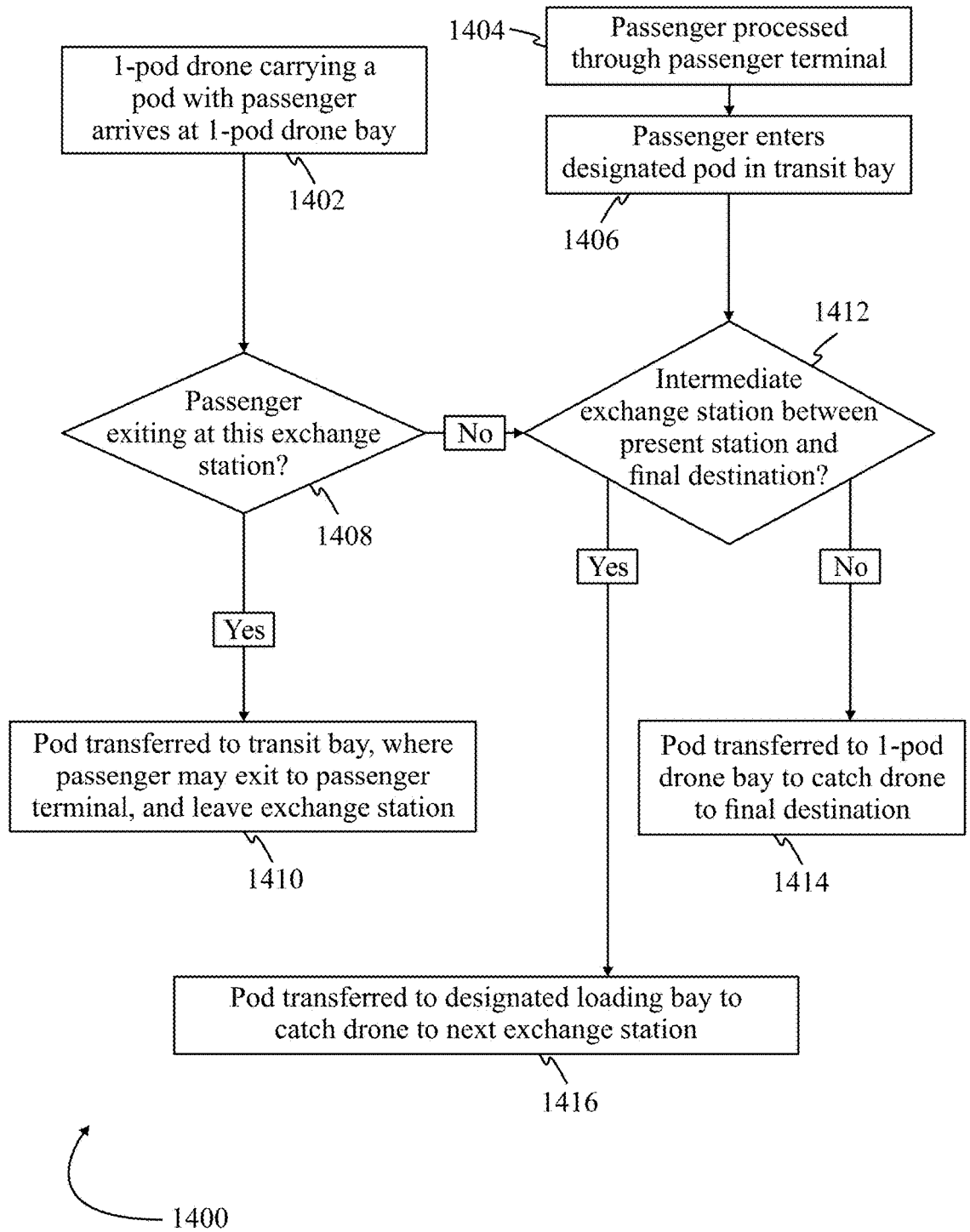
FIG. 14 is a flowchart of a method for passenger pods entering into an arrival bay exchange station system from sources other than the arrival bay according to one embodiment of the present invention.

FIG. 14 is a flowchart 1400 of a method for passenger pods entering into an arrival bay exchange station system from sources other than the arrival bay according to one embodiment of the present invention. At step 1402, a 1-pod drone may carry a pod with a passenger from areas such as shopping, home, or office to a 1-pod drone bay at the present exchange station. At step 1408, if a passenger is leaving the present exchange station, step 1408 is reached, and the pod may be transferred to a transit bay where the passenger may exit the pod, and may exit the exchange station through the passenger terminal. Returning to step 1408, if the passenger is headed to a different exchange station, step 1412 is reached. At step 1412 if there is no intermediate exchange station between the present exchange station and final stop, step 1414 is reached. At step 1414, the pod may wait at the 1-pod drone bay for a drone to transport it to the final stop. Returning to step 1412, if there are one or more intermediate exchange stations, step 1416 is reached. At step 1416 the pod is transferred to a loading bay heading to the passenger's next exchange station.

On the passenger terminal side, which may be occurring simultaneously, at step 1404 a second passenger is processed through the passenger terminal. At step 1406, the second passenger may enter a fully charged pod in the transit bay designated to them during processing in the passenger terminal. After which, step 1412 is reached. At step 1412 if there is no intermediate exchange station between the present exchange station and final stop, step 1414 is reached. At step 1414, the pod may be transferred to the 1-pod drone bay to catch a drone to transport it to the final stop. Returning to step 1412, if there are one or more intermediate exchange stations, step 1416 is reached. At step 1416 the pod is transferred to a loading bay heading to the second passenger's next exchange station. For parcel pods, a pod from a parcel bay may enter the transfer path and be transported to a designated loading bay at any time, or to the 1-pod drone bay to be transported to an office or residence.

Figure 15:
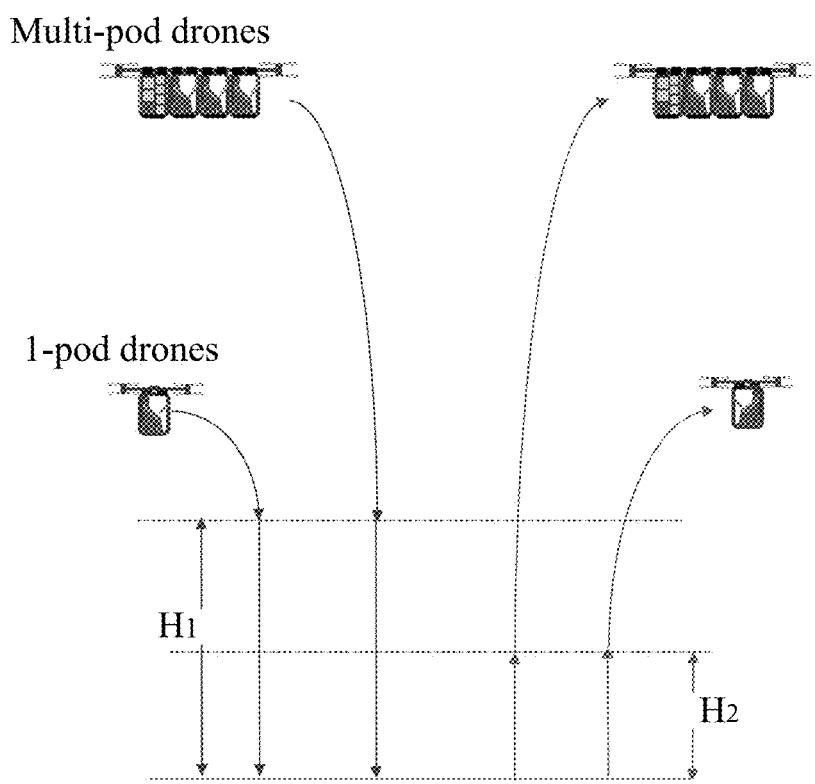
FIG. 15 illustrates preferable operating altitudes for drones relative to exchange stations.

FIG. 15 illustrates preferable operating altitudes for drones relative to exchange stations. Exchange station control checks arriving 4-Pod or 1-Pod drones for routing information to verify Pods should be landing at a particular exchange station. If not, or if a Passenger wishes to change route mid-flight, that Pod will instead transfer out of arrival bay into the transit bay, where it is re-programmed and transferred via a transfer path through transfer path to the new target loading bay.

Height H2 is minimum height to clear all ground obstacles. This is height drones must attain ascending vertically, then drones may stop climbing vertically and begin to travel towards destination. H1 is height above ground when descending drones start to descend vertically to ground. Heights H1 and H2 are initial safety heights to clear the Exchange Station. Once clear, the drones may ascend to their traveling altitude in their directed droneways, the height depending on their direction.

It will be apparent to one with skill in the art, that the embodiments described above are specific examples of a single broader invention which may have greater scope than any of the singular descriptions taught. There may be many alterations made in the descriptions without departing from the spirit and scope of the present invention.

The invention claimed is:

1. A drone transport system, comprising:
 a carrier pod adapted for carrying a passenger or parcels with the passenger or parcels enclosed, the carrier pod having a first attachment interface at an uppermost extremity, the first attachment interface comprising first physical attachment elements;
 a flight-enabled drone comprising a plurality of electric motors driving a plurality of propeller rotors providing propulsion, a first battery in the drone adapted to power the electric motors, and having a downward-facing second attachment interface comprising second physical attachment elements compatible for joining with the first physical attachment elements of the carrier pod;
 a second battery in the carrier pod of capacity sufficient to power the plurality of electric motors of the drone;
 a carrier pod power cable from the battery in the carrier pod to a first power connector in the first attachment interface connectors; and
 a drone power cable from a second power connector in the second attachment interface, providing power to the electric motors of the drone;
 wherein the flight-enabled drone is controllable to approach the carrier pod from above, aligning and engaging the second physical attachment elements with the first physical attachment elements, engaging as well the first and second power connectors, to lift and carry the pod from one place to another, and to land and disengage the first and second physical attachment elements, leaving the carrier pod at a new place, and wherein, with the power connectors and the attachment elements engaged, the electric motors of the drone are powered by the second battery in the carrier pod, and with the power connectors and attachment elements disengaged, the electric motors of the drone are powered by the first battery in the drone.

2. The drone transport system of claim 1 wherein the first and the second attachment interfaces comprise at least two physical attachment elements each, providing redundancy.

3. The drone transport system of claim 2 wherein there are four attachment elements in each of the first and the second attachment interfaces.

4. The drone transport system of claim 1 wherein the carrier pod is a passenger pod accommodating one person and includes a seat for the one person.

5. The drone transport system of claim 1 wherein the carrier pod is a parcel carrier pod, has the same attachment interface as a passenger pod, but has no seat for a passenger.

6. The drone transport system of claim 1 wherein the flight-enabled drone is enabled to attach to and carry a plurality of passenger pods, or parcel pods, or a mixture of each.

7. The drone transport system of claim 6 wherein the flight-enabled drone carries the plurality of passenger or parcel pods arranged in a line in the direction of flight.

8. The drone transport system of claim 6 wherein the flight enabled drone is adapted to attach to and carry four passenger or parcel pods.

9. The drone transport system of claim 1 wherein the carrier pod is a passenger pod accommodating a plurality of persons, and includes seats for each of the persons carried.

10. The drone transport system of claim 9 wherein the passenger pod accommodates four persons in seats one behind the other.

11. The drone transport system of claim 9 wherein the passenger pod accommodates eight people in two rows of four each.

12. The drone transport system of claim 1 wherein the flight-enabled drone further comprises a control system with wireless connectivity to one or more remote control stations, enabling the flight-enabled drone to be piloted remotely to transport carrier pods from place to place.

13. The drone transport system of claim 4 wherein the second battery is located beneath the seat.

14. The drone transport system of claim 1 wherein the carrier pod comprises a control panel having I/O capability for a passenger to input and access data and information.

15. The drone transport system of claim 1 further comprising surface-located exchange stations at different geographic locations, enabling exchange of carrier pods by flight enabled drones, such that carrier pods may be efficiently routed from and to a wide variety of surface locations.

16. The drone transport system of claim 15 wherein exchange stations comprise facilities for passengers to embark and disembark to carrier pods, and for flight-enabled drones to engage and lift, and land and disengage carrier pods.

17. The drone transport system of claim 16 further comprising computerized control scheduling flights, ticketing and booking.

* * * * *